United States Patent
Miklós et al.

(10) Patent No.: US 11,172,409 B2
(45) Date of Patent: Nov. 9, 2021

(54) METHODS AND APPARATUS FOR HANDOVER CONTROL OF AFFILIATED COMMUNICATION MODULES IN A WIRELESS COMMUNICATION NETWORK

(71) Applicant: Telefonaktiebolaget LM Ericsson (publ), Stockholm (SE)

(72) Inventors: György Miklós, Pilisborosjenö (HU); János Harmatos, Budapest (HU); Attila Mihály, Dunakeszi (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/630,313

(22) PCT Filed: Jul. 13, 2017

(86) PCT No.: PCT/EP2017/067711
§ 371 (c)(1),
(2) Date: Jan. 10, 2020

(87) PCT Pub. No.: WO2019/011434
PCT Pub. Date: Jan. 17, 2019

(65) Prior Publication Data
US 2020/0205039 A1    Jun. 25, 2020

(51) Int. Cl.
*H04W 4/00* (2018.01)
*H04W 36/00* (2009.01)
(Continued)

(52) U.S. Cl.
CPC ......... *H04W 36/0009* (2018.08); *H04W 4/70* (2018.02); *H04W 36/08* (2013.01); *H04W 40/36* (2013.01)

(58) Field of Classification Search
CPC ... H04W 36/0009; H04W 4/70; H04W 36/08; H04W 40/36; H04W 36/0027
(Continued)

(56) References Cited

U.S. PATENT DOCUMENTS

2008/0299974 A1* 12/2008 Lee ................. H04W 36/00837
455/436
2011/0211444 A1    9/2011 Das et al.
(Continued)

FOREIGN PATENT DOCUMENTS

| WO | 2011028954 A1 | 3/2011 |
|---|---|---|
| WO | 2016095115 A1 | 6/2016 |

(Continued)

OTHER PUBLICATIONS

Roome, W, "ALTO Incremental Updates Using Server-Sent Events (SSE) draft-ietf-alto-incr-update-sse-02", ALTO WG; Internet-Draft; Intended status: Standards Track, Apr. 4, 2016, pp. 1-38.
(Continued)

*Primary Examiner* — Marcos Batista
(74) *Attorney, Agent, or Firm* — Murphy, Bilak & Homiller, PLLC

(57) ABSTRACT

A wireless communication network (12) includes one or more nodes (10, 40) that individually or cooperatively prevent affiliated communication modules (14) from being handed over at the same time. Affiliated communication modules (14) provide a machine, device, or other entity (16) with redundant access to the network (12) and preventing the simultaneous handover of affiliated communication modules (14) within the network (12) reduces the chance that the involved entity (16) will lose radio connectivity or experience an interruption in its communications. Although not limited to Critical Machine Type Communication, C-MTC, applications, such operations improve connection (Continued)

redundancy and reliability for C-MTC entities that use two or more communication modules (14) for redundant access to a wireless communication network (12).

19 Claims, 16 Drawing Sheets

(51) Int. Cl.
*H04W 4/70* (2018.01)
*H04W 36/08* (2009.01)
*H04W 40/36* (2009.01)

(58) Field of Classification Search
USPC .......................................................... 370/331
See application file for complete search history.

(56) References Cited

U.S. PATENT DOCUMENTS

| | | |
|---|---|---|
| 2012/0021744 A1 | 1/2012 | Chin et al. |
| 2013/0040680 A1 | 2/2013 | Kim et al. |
| 2013/0260761 A1 | 10/2013 | Walke et al. |
| 2014/0092872 A1* | 4/2014 | Rentschler ............... H04L 1/22 370/331 |
| 2015/0065106 A1 | 3/2015 | Catovic et al. |
| 2015/0117183 A1 | 4/2015 | Heo et al. |
| 2016/0020800 A1 | 1/2016 | Krishnamoorthy et al. |
| 2016/0174232 A1 | 6/2016 | Krishnamoorthy et al. |

FOREIGN PATENT DOCUMENTS

| | | |
|---|---|---|
| WO | 2017137075 A1 | 8/2017 |
| WO | 2017220124 A1 | 12/2017 |
| WO | 2018207001 A1 | 11/2018 |

OTHER PUBLICATIONS

Unknown, Author, "Handling requirements for URLLC services with and without cell changes", 3GPP TSG-RAN WG2 Meeting #97; R2-1701863; Athens, Greece, Feb. 13-17, 2017, pp. 1-3.
Unknown, Author, "Method for In-band Meta-data Transfer", Research Disclosure; The Industry Standard Disclosure Publication Service, Feb. 18, 2016, pp. 1-6.
Unknown, Author, "PLUS: Path Layer UDP Substrate", Birds of a Feather (BoF) Meeting; IETF-96; Berlin, Jul. 2016, pp. 1-13.

* cited by examiner

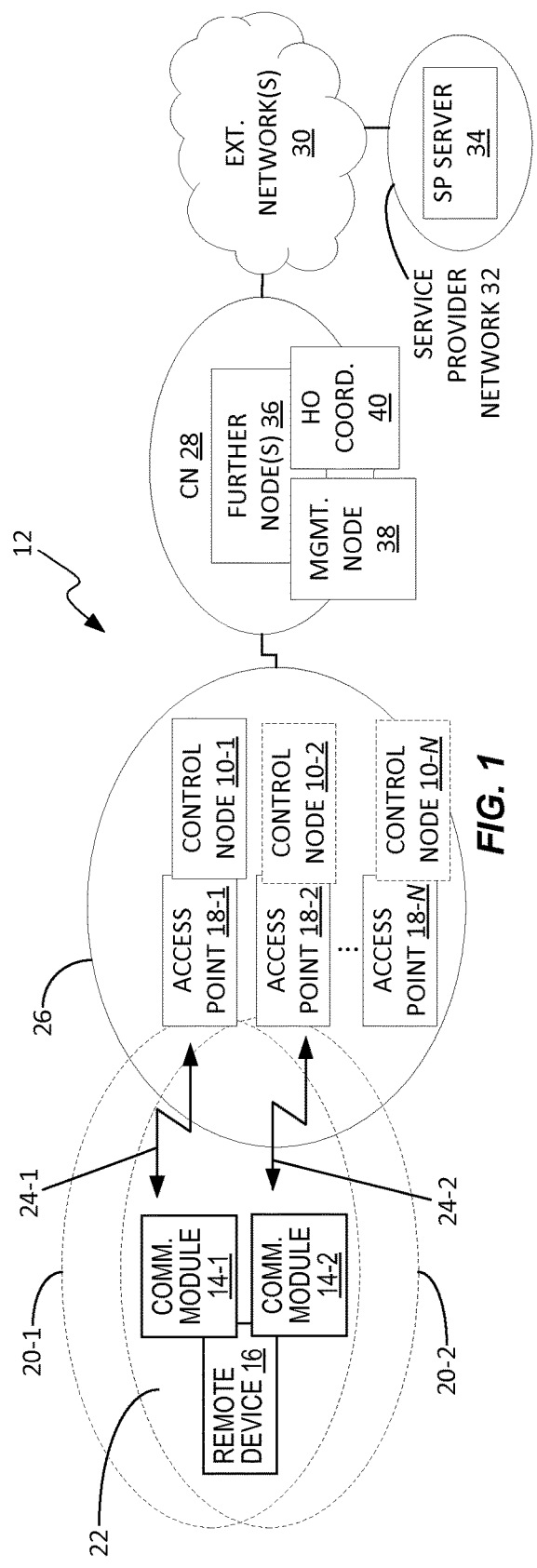
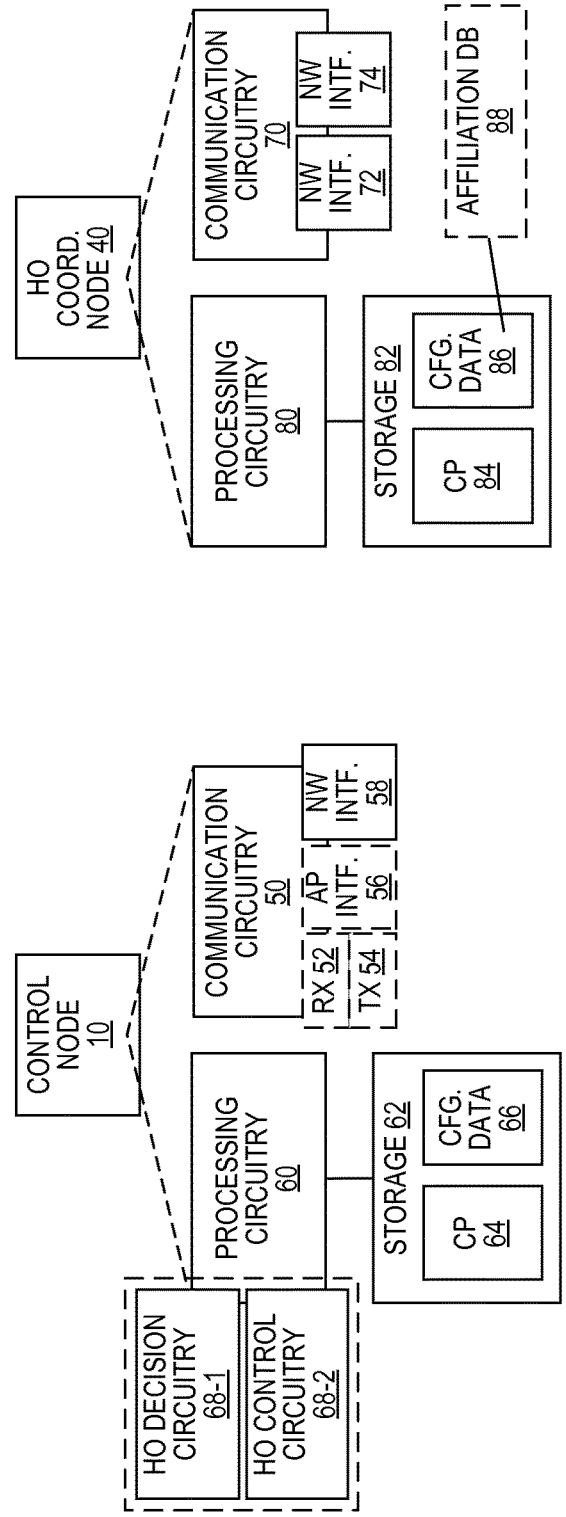

METHODS AND APPARATUS FOR HANDOVER CONTROL OF AFFILIATED COMMUNICATION MODULES IN A WIRELESS COMMUNICATION NETWORK

TECHNICAL FIELD

The present invention relates to wireless communication networks and particularly relates to handover control in a wireless communication network.

BACKGROUND

As the prevalence and sophistication of wireless communication networks grow, so too does the range of applications made to depend on them. Fielded and contemplated uses of wireless communication networks include Machine Type Communication (MTC) applications—also referred to as Machine-to-Machine or M2M applications. Key examples include the large-scale deployment of sensors, controllers, or other wirelessly-linked devices and systems, with such examples being broadly captured under the label "Massive MTC" (M-MTC). As another key example, certain "critical" MTC applications rely on wireless communication networks for inter-device communications, and more such applications are contemplated every day. Examples of Critical MTC (C-MTC) applications include Intelligent Traffic Systems (ITS), including Vehicle-to-Vehicle (V2V) and Vehicle-to-Everything (V2X) applications, so-called "Smart Grid" applications, Automated Guided Vehicles (AGVs), telesurgery, drone and other unmanned vehicle control, along with factory automation and process control.

In the above context, the word "critical" has rich meaning. For example, it may connote the need for low latency or other key Quality-of-Service (QoS) metrics needed to support real-time or near-real-time processing and control decisions. Bound up in that meaning, however, lie further meanings relating to human safety and economic considerations. For example, the loss of network-based communications in a factory control system endangers worker safety risks ruining valuable working materials. Similarly, significant economic and safety concerns attend the use of wireless communication links for autonomous vehicle control.

The so-called 5G networks now being developed and standardized provide significant new features and performance capabilities complementing both M-MTC and C-MTC applications. Among other things, 5G networks offer "lean" air interfaces, operation at low signal levels, and the potential for high data rates and strict, low-latency communications. See, for example, the work by the Third Generation Partnership Project (3GPP) on the specifications for 5G, referred to as "Release-15", including the New Radio (NR) interface contemplated for 5G connectivity.

The communication module used by an entity for connecting to the supporting wireless communication network represents a key point of failure in the overall communicative coupling scheme. In additional to failures at the communication module, the network access point providing the corresponding radio link(s) may fail. Apart from hardware failures of the communication module or the supporting access point, radio link failure (RLF) may occur between the communication module and the access point because of path fading or other deleterious circumstances. Implementing redundant communication modules in the entity represents a known approach to reducing the possibility of the entity experiencing a communication failure with respect to the wireless communication network.

While the use of redundant communication modules sounds like the long-standing practice of implementing redundant Network Interface Cards (NICs) in critical computer servers, communications redundancy is not so easily achieved in the wireless context. For example, it is recognized herein that, absent intelligent control within the supporting wireless communication network, the redundant communication modules used by a given entity may undergo service handover from one access point to another at the same time. Because the risk of RLF increases during handover, and because handover involves interruptions in data flow, allowing the simultaneous handover of affiliated communication modules vitiates the communications redundancy ostensibly provided by them.

SUMMARY

A wireless communication network includes one or more nodes that individually or cooperatively prevent affiliated communication modules from being handed over at the same time. Affiliated communication modules provide a machine, device, or other entity with redundant access to the network and preventing the simultaneous handover of affiliated communication modules within the network reduces the chance that the involved entity will lose radio connectivity or experience an interruption in its communications. Although not limited to Critical Machine Type Communication (C-MTC) applications, such operations improve connection redundancy and reliability for C-MTC entities that use two or more communication modules for redundant access to a wireless communication network.

An example method of operation performed by a network node in a wireless communication network includes determining that a service handover is to be initiated for a first communication module operating in the network. The method further includes applying a scheduling or locking mechanism, to prevent the service handover for the first communication module from coinciding with service handovers involving a second communication module that is affiliated with the first communication module and attached to the network. The network node comprises a control node, for example, such as may be co-located with or integrated into a radio access point.

In another example, a control node configured for operation in a wireless communication network includes communication circuitry and associated processing circuitry. The communication circuitry is configured to communicatively couple the control node to one or more other nodes in the network, for controlling service handovers for one or more communication modules operating in the network. Examples of other nodes include other control nodes operating as peer control nodes in the network and one or more coordinating control nodes operating in a centralized role.

The processing circuitry is configured to determine that a service handover is to be initiated for a first communication module operating in the network and apply a scheduling or locking mechanism. As before, the scheduling or locking mechanism prevents the service handover for the first communication module from coinciding with service handovers involving a second communication module that is affiliated with the first communication module and attached to the network.

Another example method of operation in a wireless communication network includes identifying a first communication module as being affiliated with a second communication module, where the first and second communication modules are attached to the network via one or more serving access points in the network. The method further includes, in response to identifying the first and second communication modules as being affiliated, arbitrating service handovers respectively involving the first and second communication modules. Arbitration prevents service handovers for the first communication module from coinciding with service handovers for the second communication module.

Arbitrating service handovers according to one or more examples comprises communicating with one or more control nodes that are included in or associated with the one or more serving access points. Communications include receiving a service handover request for one of the first and second communication modules and denying the service handover request in response to determining that a service handover has been approved or is ongoing for the other one of the first and second communication modules.

Another example involves a network node configured for operation in a wireless communication network, where the network node includes communication circuitry and associated processing circuitry. The communication circuitry is configured for communicating with one or more control nodes that are included in or associated with one or more serving access points in the network to which first and second communication modules are attached. Correspondingly, the processing circuitry is configured to identify the first communication module as being affiliated with the second communication module. Further, responsive to identifying the first and second communication modules as being affiliated, the processing circuitry is configured to arbitrate service handovers respectively involving the first and second communication modules, to prevent service handovers for the first communication module from coinciding with service handovers for the second communication module. For arbitrating the service handovers, the processing circuitry is configured receive a service handover request for one of the first and second communication modules and deny the service handover request in response to determining that a service handover has been approved or is ongoing for the other one of the first and second communication modules.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication network.

FIG. 2 is a block diagram of one embodiment of a network node operative as a control node.

FIG. 3 is a block diagram of another embodiment of a network node operative as a control node.

DETAILED DESCRIPTION

Figure 5:
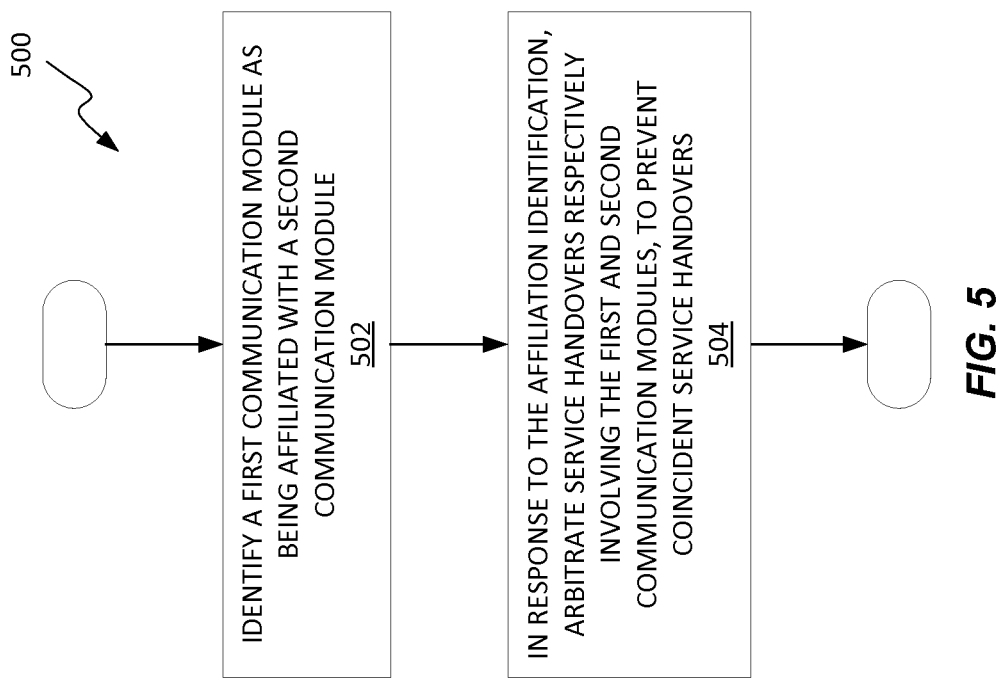
FIGS. 4 and 5 are logic flow diagrams of example embodiments of handover control methods.

FIG. 1 illustrates example control nodes 10 configured for operation within an example wireless communication network 12 ("network 12"). The network 12 comprises, for example, a Fifth Generation (5G) network providing a New Radio (NR) air interface for wirelessly connecting to communication modules (14) served by the network 12. However, the network 12 may implement a Radio Access Technology (RAT) other than NR, or in addition to NR, and other alternatives or additions include Fourth Generation (4G) implementations, popularly known as Long Term Evolution (LTE). Further, while network 12 in one or more embodiments operates according to Third Generation Partnership Project (3GPP) specifications, the techniques disclosed herein have broader applicability.

Similarly, the communication modules 14 may be User Equipments (UEs) within the meaning used in 3GPP technical specifications, but they should be understood broadly as comprising cellular modems or, more generally, radio interfaces that communicatively couple an associated remote device 16 to the network 12 via an air interface or interfaces. The communication modules 14, therefore, may be provisioned with subscriber or other credentials by which they are authenticated for access to the network 12, etc.

While the diagram illustrates one remote device 16 that is "affiliated" with two communication modules 14-1 and 14-2, there may be a potentially large and dynamically fluctuating number of remote devices 16. Some or all such devices 16 each may include more than one communication module 14 for redundantly connecting to the network 12. The word "device" at least when used in the term "remote device" may refer to a complex subassembly, assembly, or system, and the word "remote" indicates a wireless connection to the network 12.

By way of example, the depicted remote device 16 comprises a vehicle or other assembly that uses the network 12 for critical communications involving public safety or high stakes application. Because of the need for uninterrupted availability and high reliability of communications between the remote device 16 and the network 12, the remote device 16 includes or otherwise uses two or more communication modules 14 for redundantly connecting to the network 12, shown here as 14-1 and 14-2. There may be multiple and varied remote devices 16 connecting to the network 12 at various times and any of them may use two or more communication modules 14 for redundantly connecting to the network 12.

In other details, the network 12 includes one or more access points 18, with 18-1 through 18-N depicted by way of example. Each access point 18 provides a corresponding radio cell or coverage area 20, e.g., the access point 18-1 provides a cell or coverage area 20-1, the access point 18-2 provides a cell or coverage area 20-2, and so on. The respective coverage areas provided by two or more geographically neighboring access points 18 may overlap, thereby forming an overlapping coverage area 22. A remote device 16 operating in an overlapping coverage area 22 may experience good or at least sufficient signal strength with respect to more than one access point 18, meaning that there is some discretion in controlling which access point or points 18 serve the remote device 16. Here, unless a more specific meaning appears in context, the term "serve" does not necessarily denote the active exchange of user traffic, but does connote the ability to establish a connection—radio link—of sufficient quality with the remote device 16.

In the depicted embodiment, a control node 10 corresponds to each access point 18, e.g., the control node 10-1 corresponds to the access point 18-1, the control node 10-2 corresponds to the access point 18-2, and the control node 10-N corresponds to the access point 18-N. Each control node 10 may be co-located with its corresponding access point 18 or may be integrated into the corresponding access point 18. That is, in at least one embodiment, the functionality of interest may be attributed to a "control node 10" even when the functionality lies entirely within or is subsumed by the corresponding access point 18.

As will be seen, in some embodiments, the respective control nodes 10 communicate with each other for handover control. In other embodiments, they communicate with a central coordination entity—described later. In yet other embodiments, the control nodes 10 communication with each other, e.g., using inter-access-point links, and communicate with a central coordination entry. In a further variation, a control node 10 may operate in a centralized manner with respect to a cluster or group of access points 18, and there may be multiple such arrangements of control nodes 10 and corresponding access point groups within the network 12.

Another aspect worth qualifying involves the term "cell" or "coverage area." The terms as used herein are not limited to older, conventional definitions involving fixed geographic areas and fixed radio resource assignments. 5G and other networks provide steered and dynamically adjustable coverage via beamforming, for example. Further, the cells or coverage areas 20 are not necessarily the same size, e.g., there may be macro or large coverage areas overlaid by pico or small coverage areas. Correspondingly, the access points 18 are not necessarily all the same type, or necessarily have the same power or coverage capabilities, and the different coverage areas 20 may involve the same or different Radio Access Technologies (RATs), or at least different frequencies.

For illustration simplicity, the various access points 18 appear within one Radio Access Network (RAN) 26, but there may be multiple RANs, e.g., associated with different RATs, with direct or indirect interworking between the access points 18 in different RANs. Other elements or components in the example network 12 include a Core Network (CN) 28 that communicatively couples to one or more external networks 30. Example external networks 30 include the Internet or other packet data networks. In one or more example cases, a Service Provider (SP) network 32 includes one or more SP servers 34 that provide services accessed by the remote device 16 via the network 12. That is, the remote device 16 and the SP server(s) 34 may operate as respective endpoints for user traffic conveyed through the network 12. Merely as an example, the SP server(s) 34 provide one or more Machine Type Communication (MTC) services, and the remote device 16 comprises an MTC device that uses the communication modules 14-1 and 14-2 for redundantly connecting to the network 12. In one or more examples, the remote device 16 comprises a Critical MTC (C-MTC) device and relies on its two communication modules 14-1 and 14-2 for maintaining connectivity with the network 12.

Each control node 10 controls handover of communication modules 14 in the network 12, although that description must be understood as meaning that the control node 10 controls handover to or from at least one coverage area or cell 20 in the network. As depicted, there may be multiple control nodes 10 operating as peers, e.g., each associated with a respective access point 18 or a respective group of access points 18. An alternative approach uses a hierarchical implementation of the control node 10, e.g., with some functionality implemented in the RAN 26 and some functionality implemented in the CN 28.

In one or more embodiments, the CN-level functionality provides supervisory support for the RAN-level functionality. For example, the CN 28 includes further nodes 36, such as management (MGMT.) nodes 38 or other entities that support mobility of given communications modules 14 among the respective coverage areas 20 provided by the RAN 26. For example, the management nodes 38 may comprise Mobility Management Entities (MMEs) along the lines provided for in LTE networks. The CN 28 further includes, in at least one embodiment, a handover (HO) coordination node 40 that cooperates with one or more control nodes 10, in support of the handover control detailed herein.

In the depicted example, the control node 10-1 supports handover control for the access point 18-1 with respect to a coverage area or cell 20-1, and the control node 10-2 supports handover control for the access point 18-2 with respect to a coverage area or cell 20-2. As noted, the coverage areas 20-1 and 20-2 overlap to form an overlapping coverage area 22 in which both access points 18-1 and 18-2 are candidates for providing radio service to the respective communication modules 14-1 and 14-2. As an example case, FIG. 1 depicts the communication module 14-1 as having a radio link 24-1 to the access point 18-1 and depicts the communication module 14-2 as having a radio link 24-2 to the access point 18-2.

According to example methods and apparatus detailed herein, the network 12 knows or detects that the two communication modules 14-1 and 14-2 are affiliated with each other and provide corresponding handover control for them. Particularly, network 12 applies a locking or scheduling mechanism to prevent a handover of one of the communication modules 14-1 and 14-2 from occurring when a handover of the other one is occurring or pending.

Among other things, such control lessens the chance of the involved remote device 16 experiencing radio link failures (RLFs) on its redundant radio links, and avoids blanking or disrupting communications on its redundant radio links. Of course, the scenario just detailed stands as one example, and the network 12 may have additional or alternate definitions of "affiliated" communication modules 14, and apply such control to any two or more communication modules 14 identified or detected as being affiliated according to whatever decisions are operative. As detailed later, the network 12 may employ one or more databases that indicate which communication modules 14 have affiliations with each other.

FIG. 2 illustrates an example embodiment of a control node 10. Various elements or components constitute the control node 10, including communication circuitry 50, which may include one or more receiver (RX) circuits 52 and one or more transmitter (TX) circuits 54. Circuit details for the communication circuitry 50 depend on where the control node 10 resides within the network 12 and on the implementation of the handover control scheme. In one or more examples, each of one or more access points 18 in the network 12 incorporate functionalities constituting a control node 10. Thus, the communication circuitry 50 may be shared with the access point 18 and include inter-access-point communication circuits, such as the circuitry included in Long Term Evolution (LTE) base stations (eNodeBs) for the "X2" interface. Additionally, or as an alternative, the communication circuitry 50 corresponds to the "S1-MME" interface used to communicatively couple eNodeBs to respective Mobility Management Entities (MMEs) in the Evolved Packet Core (EPC) used in LTE networks.

In other example embodiments, the control node 10 exists separately from any access point 18, although it may be co-located with and support an access point 18 or a group of access points 18. In such embodiments, the communication circuitry 50 includes circuitry, such as Ethernet or other computer network interface circuitry, for communicatively coupling to one or more access points 18, e.g., for effectuating handover control and exchanging supporting information. Such circuitry appears in the diagram as "AP INTF." 56. The communication circuitry 50 in at least one such embodiment includes inter-control-node interface circuitry configured for wireless or, preferably, wired, connections between peer control nodes 10. Still further, in embodiments that involve centralized handover control functionality in the CN 28, the communication circuitry 50 in each control node 10 includes circuitry for interfacing with a supervisory node in the CN 28. For example, the control node 10 includes network interface circuitry 58, for communicating with a centralized handover coordination node, e.g., in the CN 28. Alternatively, the control node 10 exploits preexisting interfaces between the access points 18, and between an access point and the CN 28 for such communications.

Other entities or components in the depicted control node 10 include processing circuitry 60, which includes or is associated with storage 62. The processing circuitry 60 comprises fixed circuitry, or preprogrammed circuitry, or programmable circuitry, or any combination of fixed, preprogrammed, and programmable circuitry. Non-limiting examples include one or more microprocessors, microcontrollers, Digital Signal Processors (DSPs), Field Programmable Gate Arrays (FPGAs), Complex Programmable Logic Devices (CPLDs), Application Specific Integrated Circuits (ASICS), or essentially any other arrangement of digital processing circuitry, such as combinational digital logic, sequential digital logic, or both.

In at least one example, the processing circuitry 60 comprises one or more processors—e.g., microprocessors—that are specially adapted to perform the operations described herein based on executing computer program instructions from one or more computer programs stored in a computer-readable medium providing non-transitory storage for the computer program(s). "Non-transitory" does not necessarily mean unchanging but does connote at least some persistence, and various types of computer-readable media may be involved, such as a mix of non-volatile memory for long-term storage of the computer program(s) and volatile memory as working memory for program execution and scratch data.

Correspondingly, in one or more embodiments, the storage 62 stores one or more computer programs 64 comprising computer program instructions the execution of which by one or more processors realizes or implements the processing circuitry 60. The storage 62 may further store one or more items of configuration data 66, based on receiving it during live operation or based on it being pre-stored. The configuration data 66 comprises, for example, information regarding the identities of communication modules 14 connected to one or more access points 18, lists of neighboring access points 18, and/or affiliation information indicating affiliations between respective communication modules 14. In one or more embodiments, affiliation information resides in one or more affiliation databases.

The processing circuitry 60 at least functionally includes handover (HO) decision circuitry 68-1 that is configured to make handover decisions, along with handover control circuitry 68-2 that is configured to control handover. In one or more embodiments, such circuitry decides and controls handover from the perspective of allowing or denying a requested handover and providing corresponding signaling control to a corresponding access point 18. The involved access point 18 still performs handover-related operations, e.g., such as deciding neighbor lists, receiving neighbor-AP measurement reports from a communication module 14, evaluating neighbor-AP signal strengths, and deciding whether handover should be initiated for a communication module 14. However, that handover may or may not be allowed, or at least may be deferred, in dependence on decision-making by the integrated or associated control node 10.

FIG. 3 illustrates an example embodiment of a handover coordination node 40. Various elements or components constitute the handover coordination node 40, including communication circuitry 70, which may include one or more network interfaces 72 and 74 that communicatively couple the handover coordination node 40 directly or indirectly to the control nodes 10 in the RAN 26 and/or to other CN nodes, such as the management node 38.

Other entities or components in the depicted handover coordination node 40 include processing circuitry 80, which includes or is associated with storage 82. The processing circuitry 80 comprises fixed circuitry, or preprogrammed circuitry, or programmable circuitry, or any combination of fixed, preprogrammed, and programmable circuitry. Non-limiting examples include one or more microprocessors, microcontrollers, Digital Signal Processors (DSPs), Field Programmable Gate Arrays (FPGAs), Complex Programmable Logic Devices (CPLDs), Application Specific Integrated Circuits (ASICS), or essentially any other arrangement of digital processing circuitry, such as combinational digital logic, sequential digital logic, or both.

In at least one example, the processing circuitry 80 comprises one or more processors—e.g., microprocessors—that are specially adapted to perform the operations described herein based on executing computer program instructions from one or more computer programs stored in a computer-readable medium providing non-transitory storage for the computer program(s). "Non-transitory" does not necessarily mean unchanging but does connote at least some persistence, and various types of computer-readable media may be involved, such as a mix of non-volatile memory for long-term storage of the computer program(s) and volatile memory as working memory for program execution and scratch data.

Correspondingly, in one or more embodiments, the storage 82 stores one or more computer programs 84 comprising computer program instructions the execution of which by one or more processors realizes or implements the processing circuitry 80. The storage 82 may further store one or more items of configuration data 86, based on receiving it during live operation or based on it being pre-stored. The configuration data 86 comprises, for example, an affiliation database 88.

In at least one embodiment, given communication modules 14 are "affiliated" for purposes of handover control if they are identified in the affiliation database 88 as being affiliated. By way of example, the affiliation database 88 comprises a data structure that logically associates pairs, triplets, or sets of communication modules 14 as being affiliated. The affiliation database 88 may be pre-provisioned, or populated on the fly, based on detecting which communication modules 14 operating in the network are affiliated. For example, receiving information from two communication modules 14 indicating that they are associated with the same remote device 16 provides a basis for recognizing them as being affiliated.

In one example, the affiliation database 88 includes entries, in which the communication module identified in each entry are treated as being affiliated. Each entry may include or link to a remote device identifier, identifying the remote device 16 through which or by which the communication modules 14 are affiliated. One approach to building out the affiliation database 88 on the fly involves obtaining a communication module identifier from any given communication module 14 when it attaches to the RAN 26, such as an International Mobile Subscriber Identity (IMSI) or International Mobile Equipment Identifier (IMEI), etc., and further obtaining from the communication module 14 an identifier for its associated remote device 16. That approach allows the network 12 to compare the remote device identifiers associated with each connected communication module 14, for determining which communication modules 14 are affiliated with each other and, therefore, subject to the handover control disclosed herein.

Of course, some types of communication modules 14 may report remote device associations and some may not. Further, the network 12 may support communication modules 14 that are standalone or otherwise unaffiliated. Thus, a mix of the above-described operations, capabilities, and deployments may be used in the network 12. For example, the network 12 may recognize certain categories of communication modules 14 as being used for connecting remote devices 16, or may recognize certain values or ranges of communication module identifiers as identifying communication modules 14 used for connecting remote devices 16. As an alternative, the network 12 may interpret the lack of affiliation information in the affiliation database 60 for a given communication module identifier as an indication that the corresponding communication module 14 is not affiliated with any other communication module 14.

Turning back to the control node 10 and an example configuration thereof, a control node 10 is configured for operation in a wireless communication network, e.g., the network 12, and it includes communication circuitry 50 and processing circuitry 60 that is operatively associated with the communication circuitry 50. The communication circuitry 50 is configured to communicatively couple the control node 10 to one or more other nodes in the network 12, for controlling service handovers for one or more communication modules 14 operating in the network 12. For example, the communication circuitry 50 communicatively couples the control node 10 to one or more other control nodes 10 and/or to the handover coordination node 40.

In turn, the processing circuitry 60 is configured to determine that a service handover is to be initiated for a first communication module 14-1 operating in the network 12, and apply a scheduling or locking mechanism, to prevent the service handover for the first communication module 14-1 from coinciding with service handovers involving a second communication module 14-2 that is affiliated with the first communication module 14-1 and attached to the network 12.

Here, the terms "first" and "second" operate as labels of convenience and do not denote the order in which the communication modules 14-1 and 14-2 connected to the network 12, and do not connote any special "status" or configuration of the two communication modules 14 with respect to each other or with respect to their associated remote device 16. Further, "applying" the scheduling and/or locking from the perspective of the processing circuitry 60 (and the control node 10 at large) may comprise directly applying the locking or scheduling—i.e., performing the locking or scheduling at the control node 10, or may comprise initiating another node to perform the locking or scheduling. For example, there may be advantages associated with the scheduling operations being done at the involved access point 18. Thus, in at least some embodiments where the control node 10 in question is not integrated in the involved access point 18, the control node 10 may apply a scheduling mechanism for a given communication module 14 by sending corresponding control signaling to the involved access point 18.

Further, the processing circuitry 60 is configured, for example, to determine that the service handover is to be initiated for the first communication module 14-1 by obtaining a handover decision indication from a first access point 18-1 to which the first communication module 14-1 is attached. For example, the first access point 18-1 may make an initial determination or decision that handover is needed, such that the processing circuitry 60 determining that a service handover is to be initiated for the first communication module 14-1 constitutes the first processing circuitry 60 determining that the first access point 18-1 has sent an indication of the initial handover decision made by it for the first communication module 14-1. This initial decision is based on, for example, radio conditions. Internal signaling carries the handover decision indication, for example, in a case where the involved access point 18 subsumes or wholly integrates the control node 10. In other instances, inter-node signaling over respective communication interfaces conveys the handover decision indication from the involved access point 18 to the involved control node 10.

In at least some embodiments, or in at least some cases, the processing circuitry 60 is configured to apply the scheduling mechanism based on assigning the first communication module 14-1 to one of two or more recurring, disjoint intervals, and restricting initiation of the service handover for the first communication module 14-1 to instances falling within the assigned interval. Here, it will be understood that the same control node 10 or another control node 10 in the network 12 assigns the second communication module 14-2 to other ones of the two or more recurring, disjoint intervals, so that the intervals available for performing handover of the first communication module 14-1 are disjoint from the intervals available for performing handover of the second communication module 14-2.

In embodiments or instances that use locking mechanisms, the processing circuitry 60 is configured to apply the locking mechanism based on communicating with another network node, e.g., another control node 10 and/or the handover coordination node 40, to obtain a lockout status of the first communication module 14-1. Here, the lockout status indicates whether the service handover of the first communication module 14-1 may be initiated or must be deferred, to avoid coinciding with a service handover for the second communication module 14-2.

In an example case of communicating with one or more other network nodes 10, 40 to obtain the lockout status of the first communication module 14-1, the processing circuitry 60 in one or more embodiments is configured to send first signaling indicating that the service handover is to be initiated for the first communication module 14-1. The first signaling further indicates an identifier of the first communication module 14-1 or indicates an identifier of a remote device 16 that uses the first communication module 14-1 for connecting to the network 12. Correspondingly, the processing circuitry 60 is configured to receive second signaling indicating the lockout status of the first communication module 14-1.

Responsive to determining from the second signaling that the first communication module 14-1 is not locked from service handovers, the processing circuitry 60 is configured to initiate the service handover for the first communication module 14-1. In the converse case, i.e., the locked case, the processing circuitry 60 is configured to prevent or defer the handover of the first communication module 14-1. For communicating with the other network node 10, 40 to determine the lockout status of the first communication module 14-1, the processing circuitry 60 in one or more embodiments is configured to send the other network node 10, 40 prioritization information that enables the other network node 10, 40 to prioritize the service handover for the first communication module 14-1 relative to an ongoing or impending service handover for the second communication module 14-2. For example, the other network node 10, 40 may receive priority information for both the first and second communication modules 14-1 and 14-2 and use the relative priority of the modules to resolve "race" conditions or potentially conflicting handovers.

The prioritization information for the first communication module 14-1 in at least some embodiments indicates signal conditions at the first communication module 14-1 relative to the network 12. The indication may be direct or indirect, such as a higher priority value for poor conditions and a lower priority for good conditions. That example approach to prioritization reflects the fact that a communication module 14 in poor radio conditions with respect to its currently serving access point 18 "needs" handover more than a communication module 14 currently enjoying good radio conditions with respect to its serving access point 18.

In at least some embodiments, or in at least some operating scenarios, the processing circuitry 60 is configured to register a first communication module 14-1 with a handover coordination node 40 in response to the first communication module 14-1 attaching to a first access point 18-1 that is associated with the involved control node 10. Registration enables the handover coordination node 40 to identify the first communication module 14-1 as being affiliated with the second communication module 14-2 and indicate to the control node 10-1 whether the control node 10-1 must defer the initiation of the service handover for the first communication module 14-1, to avoid overlapping with a service handover for the second communication module 14-2. Such registration operations presuppose that the second communication module 14-2 undergoes a similar registration with the handover coordination node 40. Further, in at least one such embodiment, registration signaling from the involved control node(s) 10 includes identifier information enabling the handover coordination node 40 to detect communication modules 14 that are affiliated.

Figure 4:
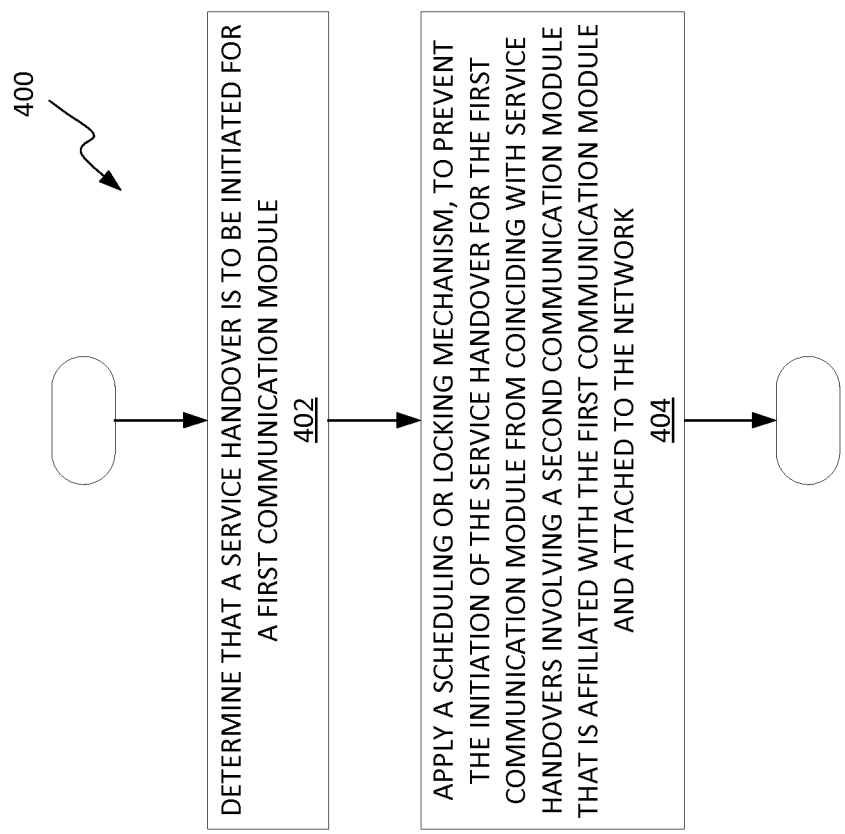

FIG. 4 depicts a method 400 implementing example handover control processing by a control node 10. The control node 10 may execute the method 400 on a continuing or ongoing basis, e.g., on a triggered or as needed basis, and may carry out the method 400 in parallel with respect to multiple handover events involving multiple communication modules 14 served by the one or more access points 18 that are associated with the control node 10.

The method includes determining (Block 402) that a service handover is to be initiated for a first communication module 14-1 operating in the network 12. Earlier explanations noted that the determination involves, for example, receiving AP-related signaling indicating that handover is needed or desired for the first communication module 14-1. Depending on whether and to what extent the control node 10 is integrated with the involved access point 18, the determination may rely on signal evaluations performed by the normal radio-control elements of the access point 18, or the control node 10 may include its own circuitry for evaluating the need or desirability of handover.

The method 400 further includes applying (Block 404) a scheduling or locking mechanism, to prevent the service handover for the first communication module 14-1 from coinciding with service handovers involving a second communication module 14-2 that is affiliated with the first communication module 14-1 and attached to the network 12. In some example implementations, the control node 10 implements only one of the prevention mechanisms, i.e., it either uses the disjoint scheduling mechanism or it uses the handover lockout mechanism. In other embodiments, the control node 10 implements both prevention mechanisms and it uses a selected one of them, e.g., in dependence on the type or capabilities of the involved communication modules 14 and access points 18 and/or in dependence on relevant network conditions at that the involved access points 18.

FIG. 5 depicts a method 500 that extends, elaborates, or complements the method 400. Implementation of the method 500 involves one or more nodes, e.g., one or more control nodes 10, one or more handover coordination nodes 40, or a mix of one or more control nodes 10 and one or more handover coordination nodes 40. The method 500 may be executed on a continuing or ongoing basis, e.g., on a triggered or as needed basis, and may be executed in parallel with respect to multiple communication modules 14 served by respective access points 18 in the RAN 26.

The method 500 includes identifying (Block 502) a first communication module 14-1 as being affiliated with a second communication module 14-2, wherein the first and second communication modules 14-1, 14-2 are attached to the network 12 via one or more serving access points 18 in the network 12. The method 500 further includes, responsive to identifying the first and second communication modules 14-1, 14-2 as being affiliated, arbitrating (Block 504) service handovers respectively involving the first and second communication modules 14-1, 14-2, to prevent service handovers for the first communication module 14-1 from coinciding with service handovers for the second communication module 14-2. Arbitrating (Block 504) service handovers comprises, for example, communicating with one or more control nodes 10 that are included in or associated with the one or more serving access points 18.

An example arbitration includes receiving a service handover request for one of the first and second communication modules 14-1, 14-2 and denying the service handover request in response to determining that a service handover has been approved or is ongoing for the other one of the first and second communication modules 14-1, 14-2. Conversely, arbitration includes receiving a service handover request for one of the first and second communication modules 14-1, 14-2 and allowing the service handover request in response to determining that a service handover has not been approved and is not ongoing for the other one of the first and second communication modules 14-1, 14-2.

The handover coordination node 40 depicted in FIG. 3 may be configured to carry out the method 500. Of course, as noted, the method 500 may be performed by two or more nodes cooperating in a distributed fashion, and the communication and processing circuitry depicted in FIG. 3 stands as a nice but non-limiting example of implementation details.

According to those details, the communication circuitry 70 of the handover coordination node 40 is configured for communicating with one or more control nodes 10 that are included in or associated with one or more serving access points 18 in the network 12 to which first and second communication modules 14-1, 14-2 are attached. The processing circuitry 80 is configured to identify the first communication module 14-1 as being affiliated with the second communication module 14-2 and, responsive to identifying the first and second communication modules 14-1, 14-2 as being affiliated, arbitrate service handovers respectively involving the first and second communication modules 14-1, 14-2.

As before, the handover coordination node 40 performs the arbitration to prevent service handovers for the first communication module 14-1 from coinciding with service handovers for the second communication module 14-2. Further, as before, for arbitrating the service handovers, the processing circuitry 80 is configured to receive a service handover request for one of the first and second communication modules 14-1, 14-2 and deny the service handover request in response to determining that a service handover has been approved or is ongoing for the other one of the first and second communication modules 14-1, 14-2. Further, for arbitrating the service handovers, the processing circuitry 80 is further configured to receive a service handover request for one of the first and second communication modules 14-1, 14-2, and, in response to determining that no other service handover has been approved or is ongoing for the other one of the first and second communication modules 14-1, 14-2, send an approval of the service handover request.

Still further, for arbitrating the service handovers, the processing circuitry 80 is further configured to deny approval of any service handover request subsequently received for the other one of the first and second communication modules 14-1, 14-2 until determining that the service handover corresponding to the approved service handover request has been completed or terminated. In yet another aspect of arbitrating service handovers, the processing circuitry 80 is further configured to receive a service handover request for one of the first and second communication modules 14-1, 14-2, and, in response to determining that no other service handover has been approved or is ongoing for the other one of the first and second communication modules 14-1, 14-2, defer approval of the service handover request for a defined interval. In response to receiving a service handover request for the other one of the first and second communication modules 14-1, 14-2 within the defined interval, the processing circuitry 80 is configured to decide which one of the service handover requests to approve based on evaluating prioritization information associated with the service handover requests.

Figure 6:
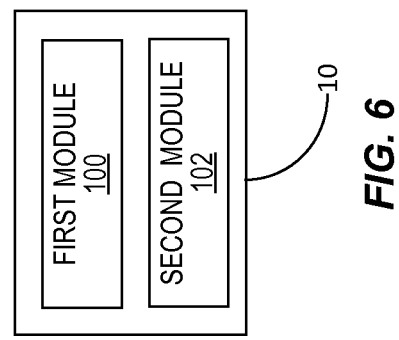

FIG. 6 depicts a control node 10 in modular form, including at least first and second modules 100 and 102. For example, the first module 100 is configured for determining that a service handover is to be initiated for a first communication module 14-1 operating in the network 12. Correspondingly, the second module 102 is configured for applying a scheduling or locking mechanism, to prevent the service handover for the first communication module 14-1 from coinciding with service handovers involving a second communication module 14-2 that is affiliated with the first communication module 14-1 and attached to the network 12.

Figure 7:
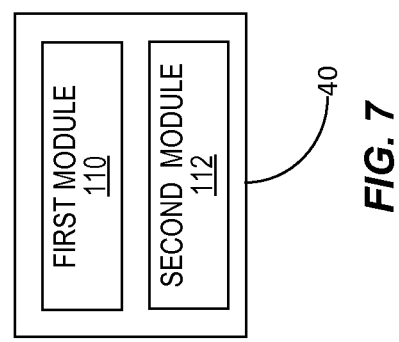
FIGS. 6 and 7 are block diagrams of further example embodiments of control nodes.

Similarly, FIG. 7 depicts a handover coordination node 40 in modular form, including a least first and second modules 110 and 112. The first module 110 is configured for identifying 502 a first communication module 14-1 as being affiliated with a second communication module 14-2. In this context, the first and second communication modules 14-1, 14-2 are attached to the network 12 via one or more serving access points 18 in the network 12. The second communication module 112 is configured for, in response to identifying the first and second communication modules 14-1, 14-2 as being affiliated, arbitrating service handovers respectively involving the first and second communication modules 14-1, 14-2. As before, the arbitration is done to prevent service handovers for the first communication module 14-1 from coinciding with service handovers for the second communication module 14-2.

Figure 8:
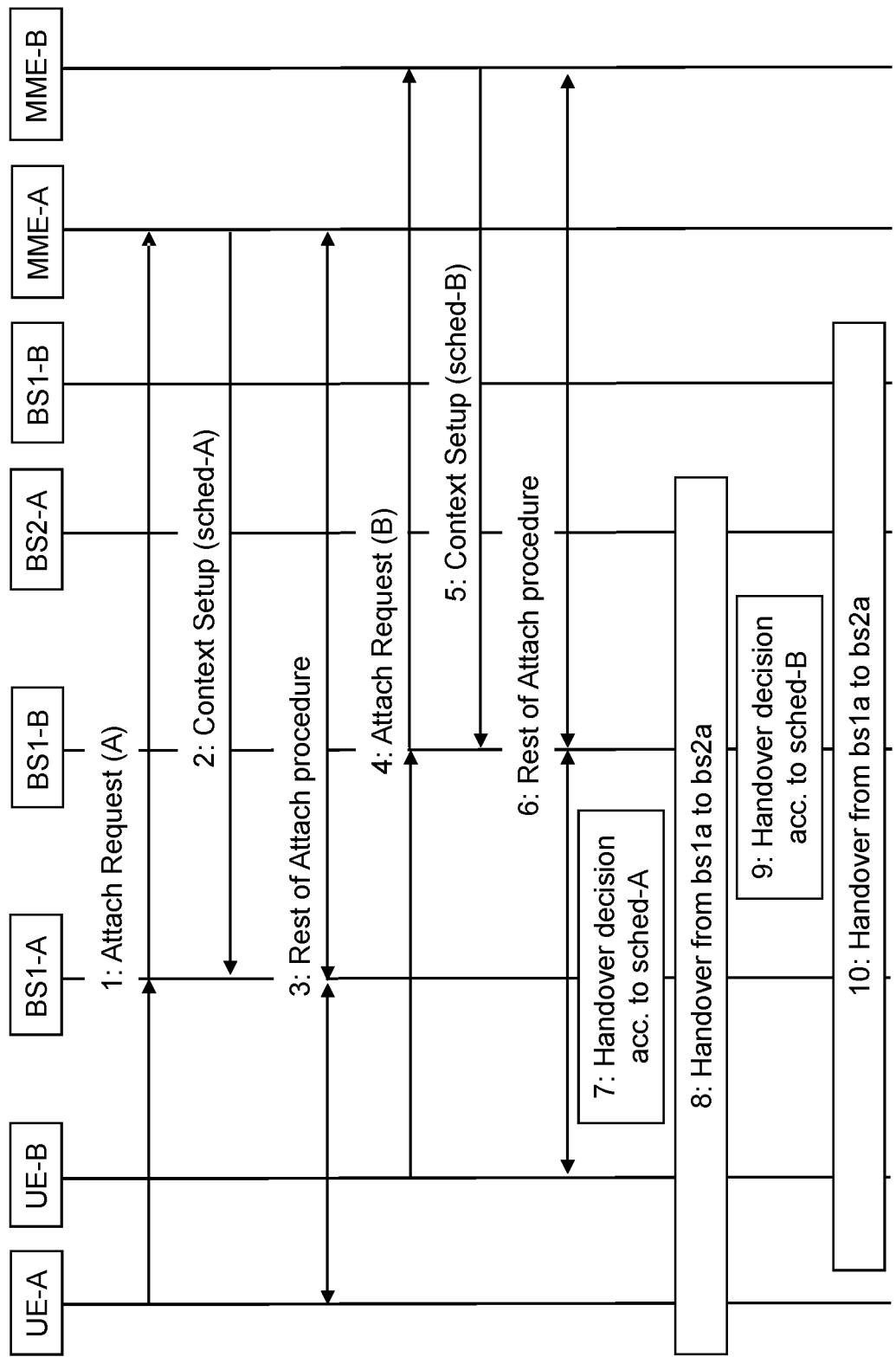
FIGS. 8, 9, 10a, 10b, 11a, 11b, and 12-18 are signaling flow diagrams of example embodiments of handover control operations.

FIG. 8 depicts an example signal flow related to the handover control contemplated herein. The label "UE-A" denotes a first communication module 14-1, whereas the label "UE-B" denotes a second communication module 14-2. The diagram assumes affiliation between the UE-A and the UE-B. The labels "BS1-A", "BS1-B", "BS2-A", and "BS2-B" denote respective access points 18 which are presumed to integrate an embodiment of the control node functionality described above. The depicted MMEs are as described above and provide support for attaching and managing the UEs.

At a top level, FIG. 8 involves a scheduling-based handover control, wherein setting a time schedule for possible handovers implies that a BS needs to wait before executing a handover, until entering one of the intervals in which handovers are permitted for the involved UE. But it is also possible that the BS also schedules the UE measurements accordingly based on when the handover decisions are made. If the BS schedules UE measurements such that they arrive right before a handover is possible to schedule, then there is no need to add extra waiting time before executing a handover, since the decision is made just before a possible time window for executing a handover.

According to Step 1, the UE-A attaches to the network 12 via BS1-A and MME-A. In this exemplary approach, UE-A is configured to provide a parameter where it identifies itself as belonging to a remote device 16. Alternatively, such information is obtained from the identifier of the UE-A, subscription records, etc. During transitions from an IDLE state to a CONNECTED state for the UE-A, a similar procedure may be used, although possibly with different messages, to determine the proper handover scheduling assignments for the UE-A.

In Step 2, the MME-A sets up the RAN context, including information about the handover scheduling plan for UE-A, governing when handovers can be executed. The scheduling plan can be constructed in the MME-A and provided to the serving BS. It may be that the MME-A is aware that the UE-A is the first UE to be connected to the network 12 for the associated remote device 16. It may also be that the UE-A informs the MME-A, based on an a priori device configuration, that it is the first UE in the remote device 16. The MME-A thus has some flexibility in assigning the UE-A to one or more defined handover intervals, or it may assign it to one or more "first" intervals by default or according to some scheme or rule that dictates the scheduling assignment. The MME-A may also take subscription information into consideration or may evaluate "loading" conditions relative to the available scheduling intervals. For example, it may assign the UE-A to a handover interval that is less crowded than another one. Step 3 denotes performance of the rest of the attachment procedure, and Steps 4-6 are similar for the UE-B, which can be understood as a second communication module 14 of the involved remote device 16—which is not depicted in the diagram.

At Step 7, a handover decision takes place at the BS1-A for the UE-A considering the scheduling plan for the UE-A. Note that the handover should be started at a time that will allow it to complete within the current interval. In some instances, the handover can be started later in the interval, if handover is urgent, or the handover can be postponed to the next applicable interval. Correspondingly, Step 8-10 depicts execution of the scheduled-based handover of the UE-A from the BS1-A to the BS2-A, whereas Steps 9 and 10 depict the handover decision and execution for the UE-B from the BS1-A to the BS2-A. Notably, because of the affiliation between the UE-B and the UE-A, handover for the UE-B occurs in a scheduling interval that is disjoint from any interval used for handing over the UE-A.

Figure 9:
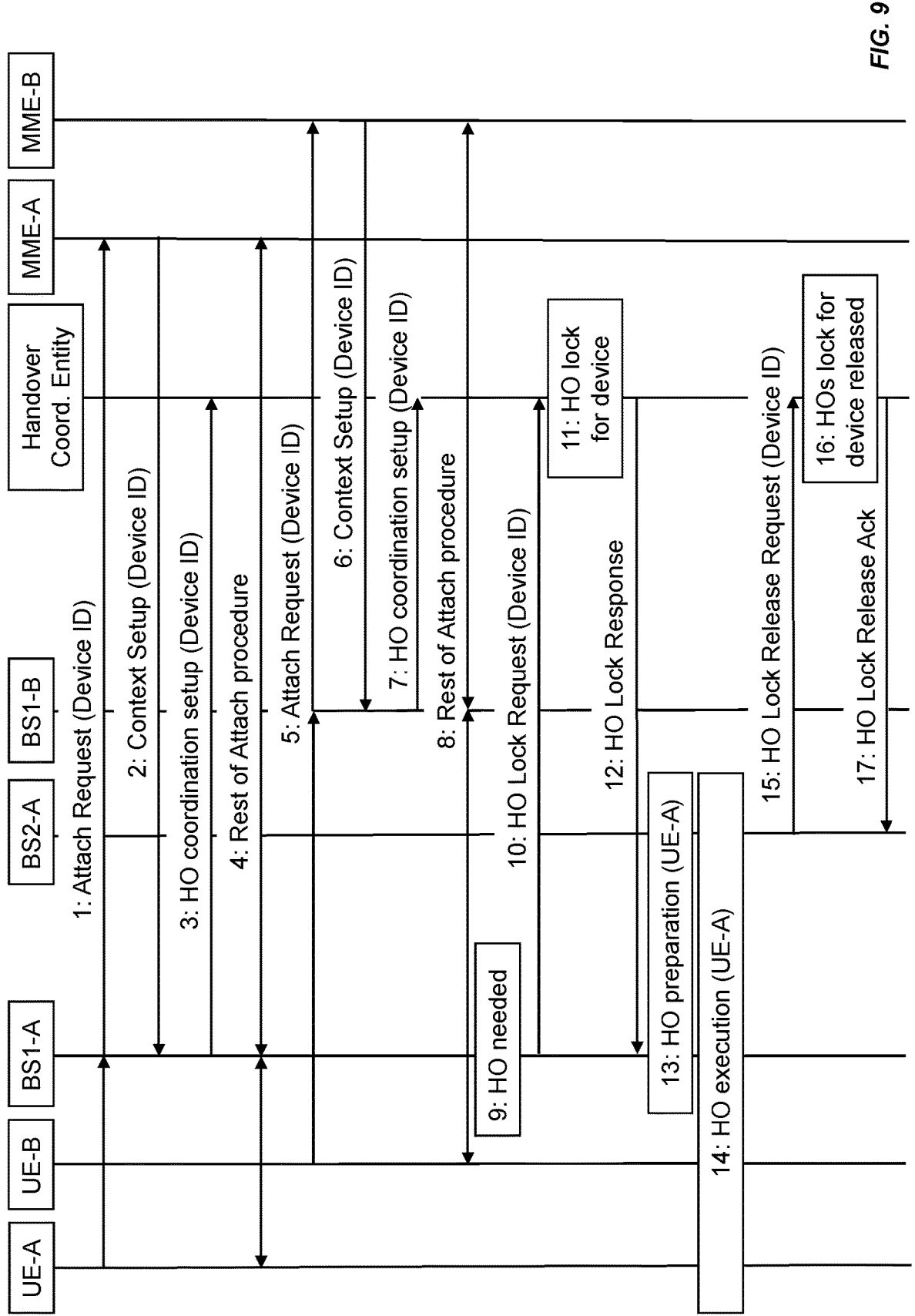

FIG. 9 depicts another handover control example, involving a handover coordination node 40 (denoted has "Handover Coord. Entity" in the diagram). At the expense of certain inter-node signaling, the coordination-based control approach obviates the need for defining and using the scheduling intervals seen in the example of FIG. 8.

The handover coordination node 40 stores, for each affiliated UE, the UE identity used in RAN—such as an S1-AP identifier—and the identity of its current BS—such as an IP address of the BS or a logical name of the BS. The handover coordination node 40 further stores an identifier of the associated remote device 16 and maintains a logical flag or other datum indicating whether handover is active for the UE. The identifier of the remote device 16 may be pre-provisioned in the network 12 or may be derived, e.g., from the UE identifiers of the UEs associated with it.

When a handover is needed for a UE, the serving BS requests that HO attempts be locked for any affiliated UEs. For example, the BS sends a signaling message to the handover coordination node 40 that includes the identifier of the remote device 16. These operations ensure that only one of the remote device's affiliated UEs can execute handover at any given time. Completion of the handover releases the handover lockout, e.g., the "target" BS that received the UE in handover sends signaling towards the handover coordination entity 40 that identifies the UE and indicates handover completion. As an alternative to involving the remote device identifier in lockout control, the handover coordination node 40 may maintain all affiliation information and all handover control lockout control based on the UE identifiers, rather than using the remote device identifier.

According to its details, FIG. 9 depicts Step 1 as involving initial attachment of the UE-A to the network 12, and it provides a device identifier, "Device ID", as part of the attachment process. Here, the Device ID identifies the remote device 16 associated with the UE-A. Alternatively, the device identifier is derived from the UE identifier, or is part of the subscription data or stored in a separate database available to the CN 28.

Step 2 involves setup of the RAN context for the UE-A, with setup including the inclusion of the Device ID in the RAN context. Correspondingly, at Step 3, the BS1-A registers the UE-A in the handover coordination node 40. Registration provides the handover coordination node 40 with the UE identifier, the Device ID, and an identifier for the BS1-A. Step 4 includes completion of the attachment procedure, and Steps 5-8 provide similar attachment processing for the UE-B. Again, the diagram assumes affiliation between the UE-A and the UE-B.

At Step 9, the BS1-A determines that a handover for the UE-A is needed. To execute the handover, the BS1-A first needs to make sure that handover is not active for any affiliated UE. To do so, Step 10 depicts the BS1-A sending a Handover Lock Request to the handover coordination node 40, where the request includes the Device ID of the remote device 16 associated with the UE-A.

At Step 11, if handover is not already locked for the remote device 16, the handover coordination node 40 "locks" handover of the affiliated UEs, and returns at Step 12 a lock response indicating that handover can proceed. Handover execution occurs at Step 14, and the BS2-A at Step 15 sends a handover lock release message to the handover coordination node 40. Here, the BS2-A represents the target access point that received the UE-A in handover, and the lock release message triggers the handover coordination node 40 to release (Step 16) the handover lock associated with the Device ID and send release acknowledgment signaling in return (Step 17).

Figure 10A:
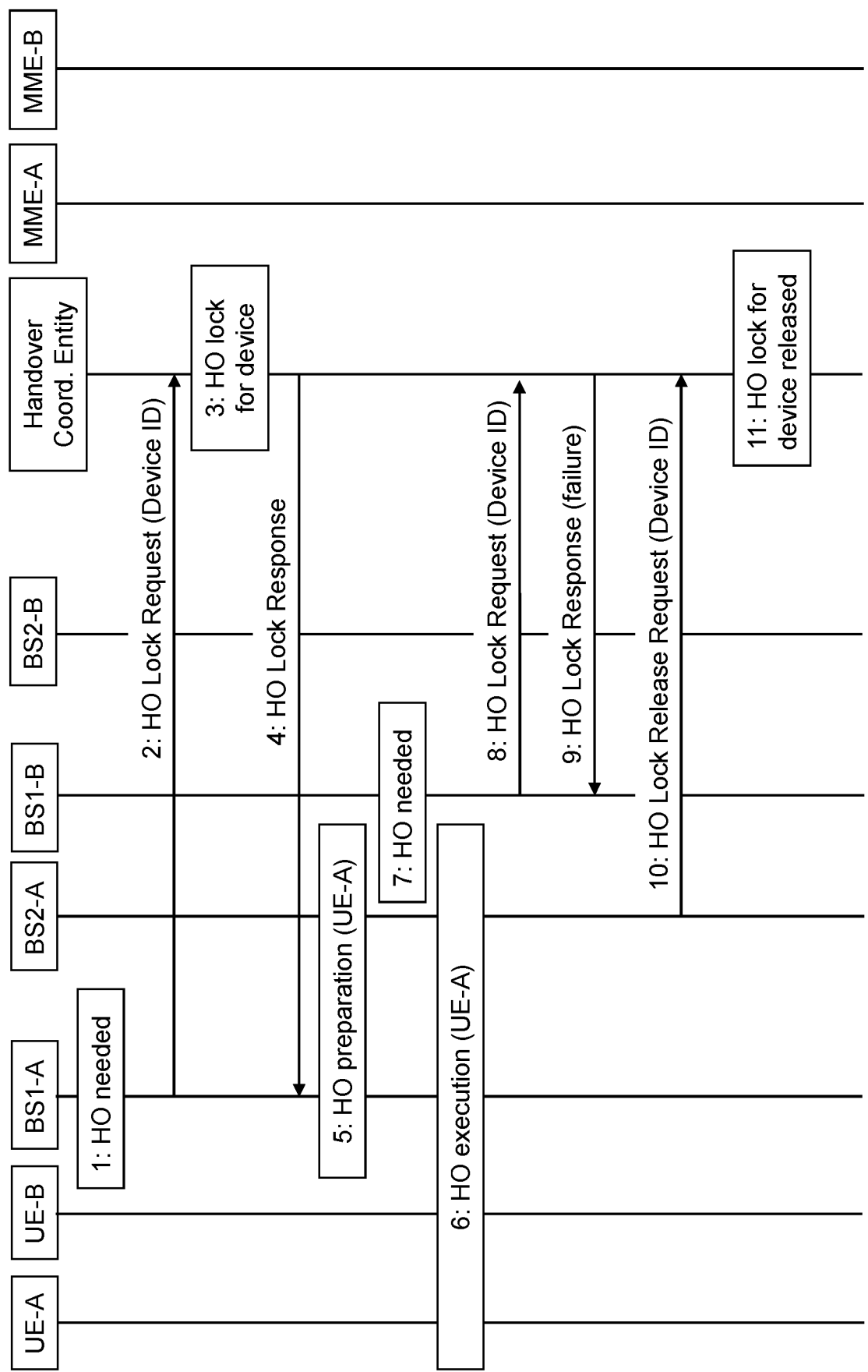
Figure 10B:
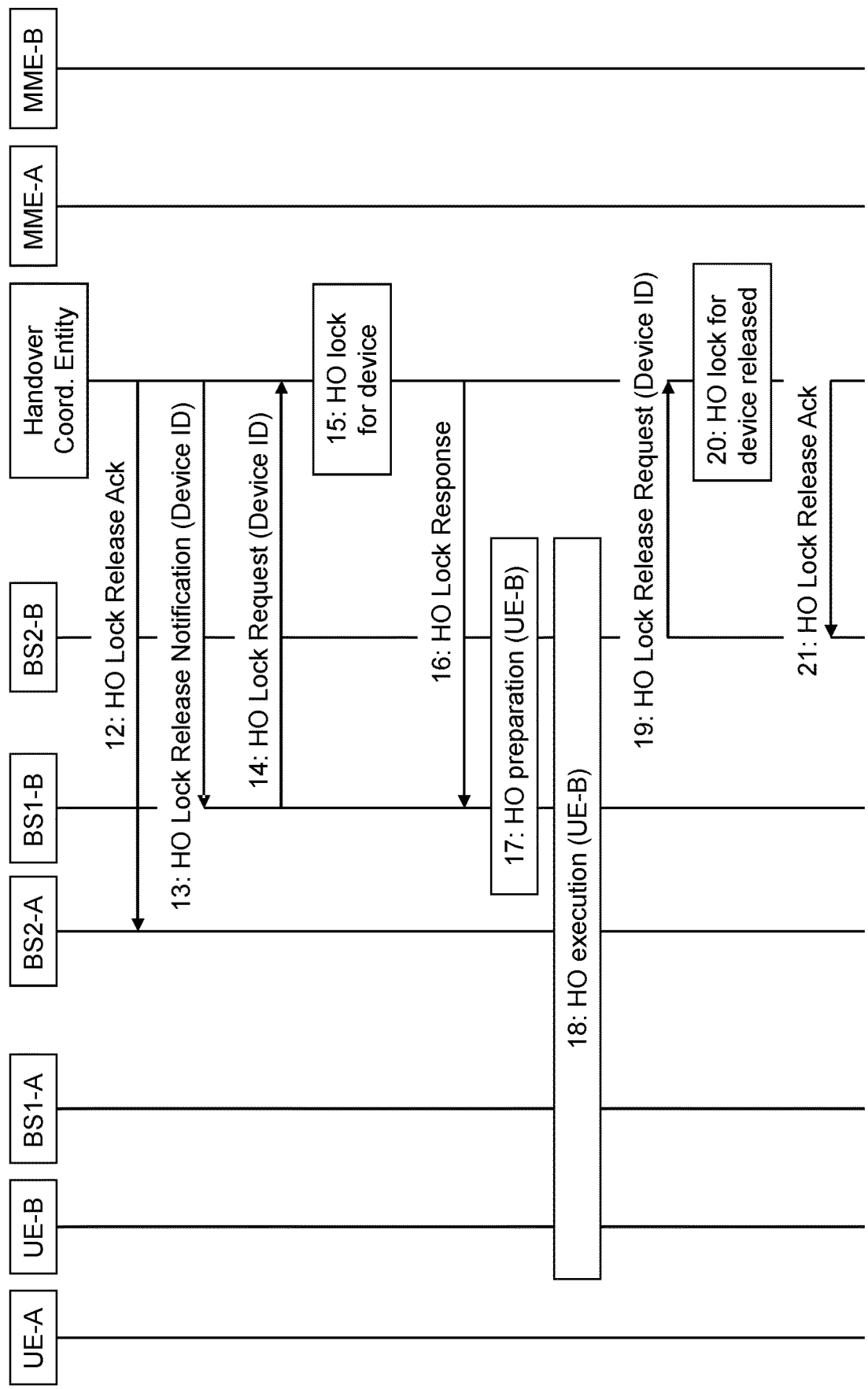

It is possible for the handover coordination node 40 to receive handover lock requests for two or more affiliated UEs at substantially the same time and at least some embodiments of the handover coordination entity 40 include conflict resolution logic to resolve such conflicts. One approach involves allowing the first UE that requests a handover to proceed. Then, the subsequent requests for a handover lock by any affiliated UE are rejected. When the handover of the first UE completes, the BSs which subsequently requested a handover lock are notified, so that they can re-request a handover lock. FIGS. 10a and 10b illustrate one implementation of the first-come-first-served approach to resolving conflicting handover lock requests.

Assuming the BS1-A serves the UE-A and that the UE-A already underwent the attachment and context setup described before, one sees at Step 1 that the BS1-A decides that handover is needed for the UE-A. Steps 2-4 involve the handover lock request and grant signaling carried out between the BS1-A and the handover coordination entity 40. One may assume here that no lockout is active for any affiliated UE at the time BS1-A requests handover lockout for the UE-A.

Handover preparations begin at Step 5 for the UE-A and handover execution begins at Step 6. However, during the time between handover preparation and execution, the BS1-B determines that handover is needed for the UE-B. As assumed before, the UE-B is affiliated with the UE-A and UE-B has undergone attachment and context setup. At Step 8, the BS1-B sends a handover lockout request to the handover coordination node 40 and receives return signaling at Step 9 indicating failure of the handover lock request. The request fails at the handover coordination node 40 because it knows that handover is active for an affiliated UE, namely, the UE-A.

However, at Step 10, the handover coordination node 40 receives a handover lock release request from the BS2-A, which was the target node involved in the handover of the UE-A. Correspondingly, at Step 11, the handover coordination entity 40 clears the handover lock against the remote device 16—i.e., against the Device ID commonly associated with the UE-A and the UE-B. Further, remembering the earlier lock failure associated with the BS1-B, the handover coordination node 40 sends a handover lock release notification to the BS1-B at Step 13. That signaling prompts the BS1-B to send a new handover lock request for the UE-B towards the handover coordination node 40—assuming handover for the UE-B is still needed or desired. Steps 15-20 depict the corresponding lock control and release associated with handover of the UE-B.

As an alternative option, the handover coordination node 40 activates the handover lock for the UE-B upon releasing the handover lock for the UE-A, without sending and explicit notification. However, handover situations may change over time and, from that perspective, the depicted explicit signaling offers certain advantages.

Instead of using a simple first come first served principle for conflict resolution, more advanced schemes are also possible. Consider a case where a remote device 16 uses two UEs, UE-A and UE-B, to maintain redundant radio links to the network 12 but treats one link as the "active" data path while treating the other link as a backup path. In such scenarios, the handover coordination node 40 may resolve conflicts between competing handovers on the active and backup paths by allowing the backup path handover to proceed first. Doing so ensures that the involved remote device 16 has a good backup path in place before undergoing handover on its active path. In a broader example of the same implementation, the network 12 may track activity on the two paths and may resolve conflicting handover requests involving the two paths by allowing handover on the less active path to proceed first. Again, the strategy is to have a good failover option in place in case the subsequent handover involving the more active path encounters trouble.

Other embodiments or other scenarios involve the converse approach, based on prioritizing the most active or most critical path, such that handover proceeds first for it in cases involving conflicting handover requests. Prioritization may be "hard coded" and indicated by the involved UEs, or prioritization may reflect dynamic evaluation by the network 12 and/or the involved UEs. For example, the network 12, assuming conflicting handover requests between two affiliated UEs, the handover coordination node 40 prioritizes the UE having poorer radio conditions. Prioritization along these lines reflects an underlying desire to avoid radio link failures for any affiliated UE. The BSs involved in the conflicting handovers provide the handover coordination node 40 with radio condition information to enable prioritization. Rather than providing lengthy information elements capturing radio conditions, the BSs may simply send an index or quantized value indicating, e.g., good or bad conditions. Further gradations of condition quality may be provided by using more index values. Of course, sending numeric priority values allows any number of bases of prioritization—e.g., cell loading, etc.—to be considered when resolving conflicting handover requests.

Figure 11A:
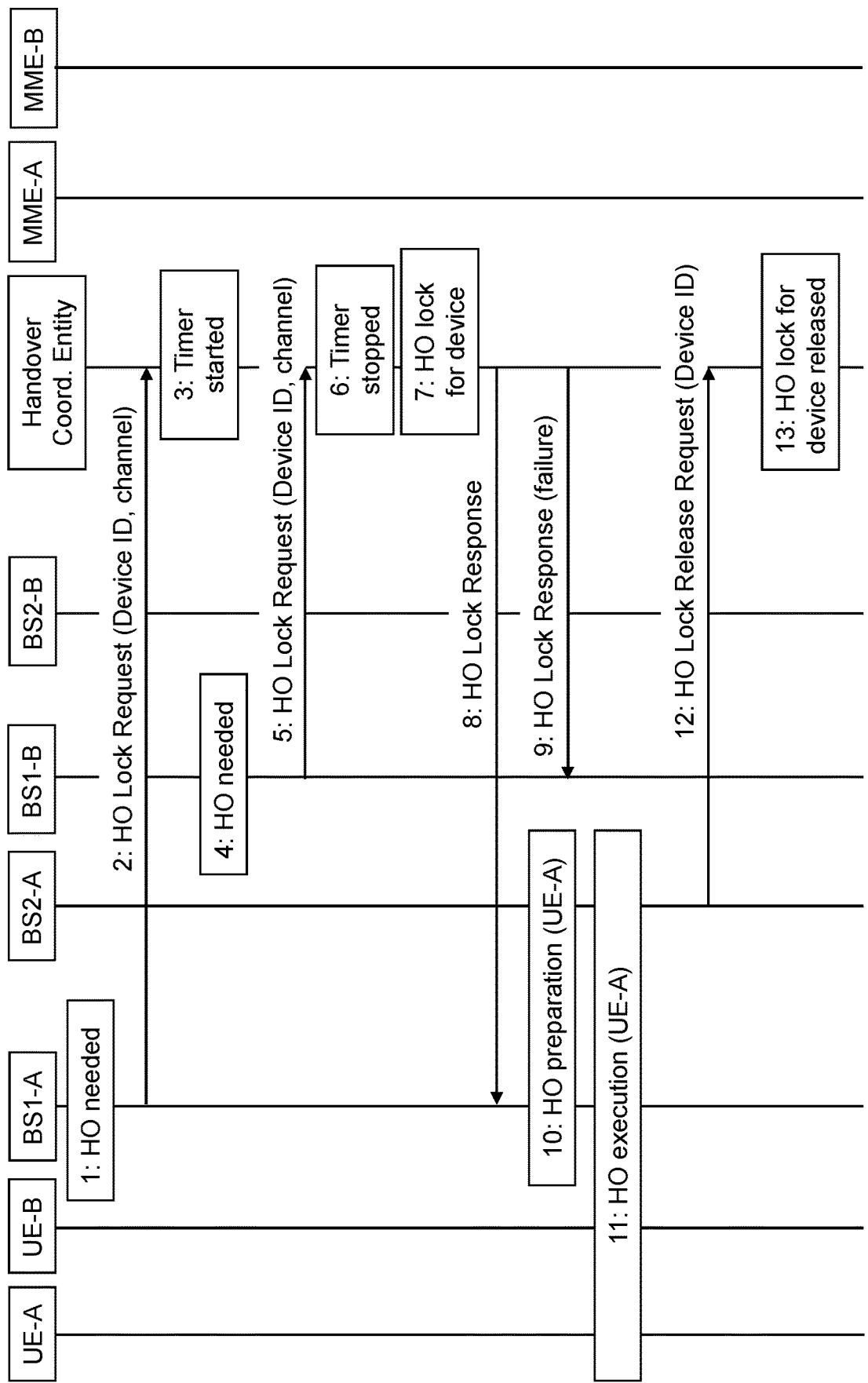
Figure 11B:
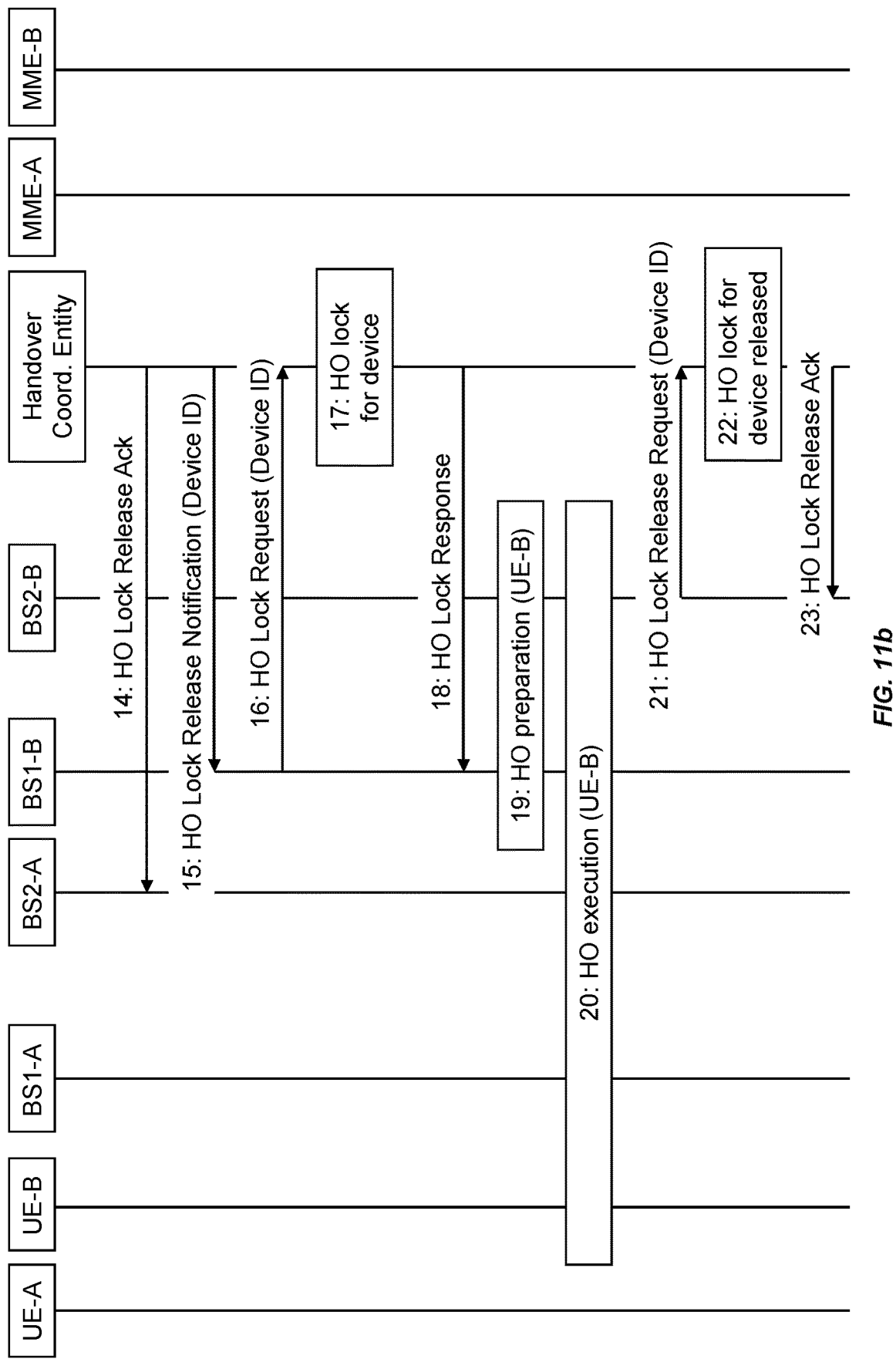

Steps 1-23 in FIGS. 11*a* and 11*b* depict an approach to handover conflict resolution that is based on a comparative evaluation of radio channel conditions, as between affiliated UEs and their respective serving BSs. Here, assume that the UE-A and the UE-B are affiliated and that the BS1-A serves the UE-A and the BS1-B serves the UE-B.

In Step 2 and elsewhere in the diagram, one sees the addition of a "channel" parameter or information element to the handover lock request signaling, which allows the handover coordination entity 40 to make a comparative evaluation of the handover "urgency." For example, at Step 2, the BS1-A sent a handover lock request for the UE-A and included a channel parameter in that request. Rather than making an immediate decision, the handover coordination node 40 starts a timer at Step 3. The timer defines a window of opportunity during which the handover coordination node 40 waits to see whether it receives any conflicting handover requests. At Step 5, it receives a conflicting handover request, as sent from the BS1-B for the UE-B. The BS1-B includes a channel parameter in the request, indicating channel conditions between it and the UE-B.

While not shown explicitly, Step 7 involves the handover coordination node 40 evaluating the relative channel conditions for the UE-A and the UE-B, and the example processing results in the handover coordination node 40 deciding to allow the handover of the UE-A and to lockout the handover of the UE-B. Of course, handover conflict resolution may be multi-faceted. For example, in addition to considering channel conditions, the handover coordination node 40 may further weight or discount competing handover lock requests based on their order of receipt, whether they are associated with primary (active) or secondary (backup) radio links, their level of activity (e.g., traffic amounts), any special Quality-of-Service (QoS) differentiators between their respective paths, etc. Steps 8-23 are as previously described for the handover lock grant and failure scenarios for the respective UEs.

Figure 12:
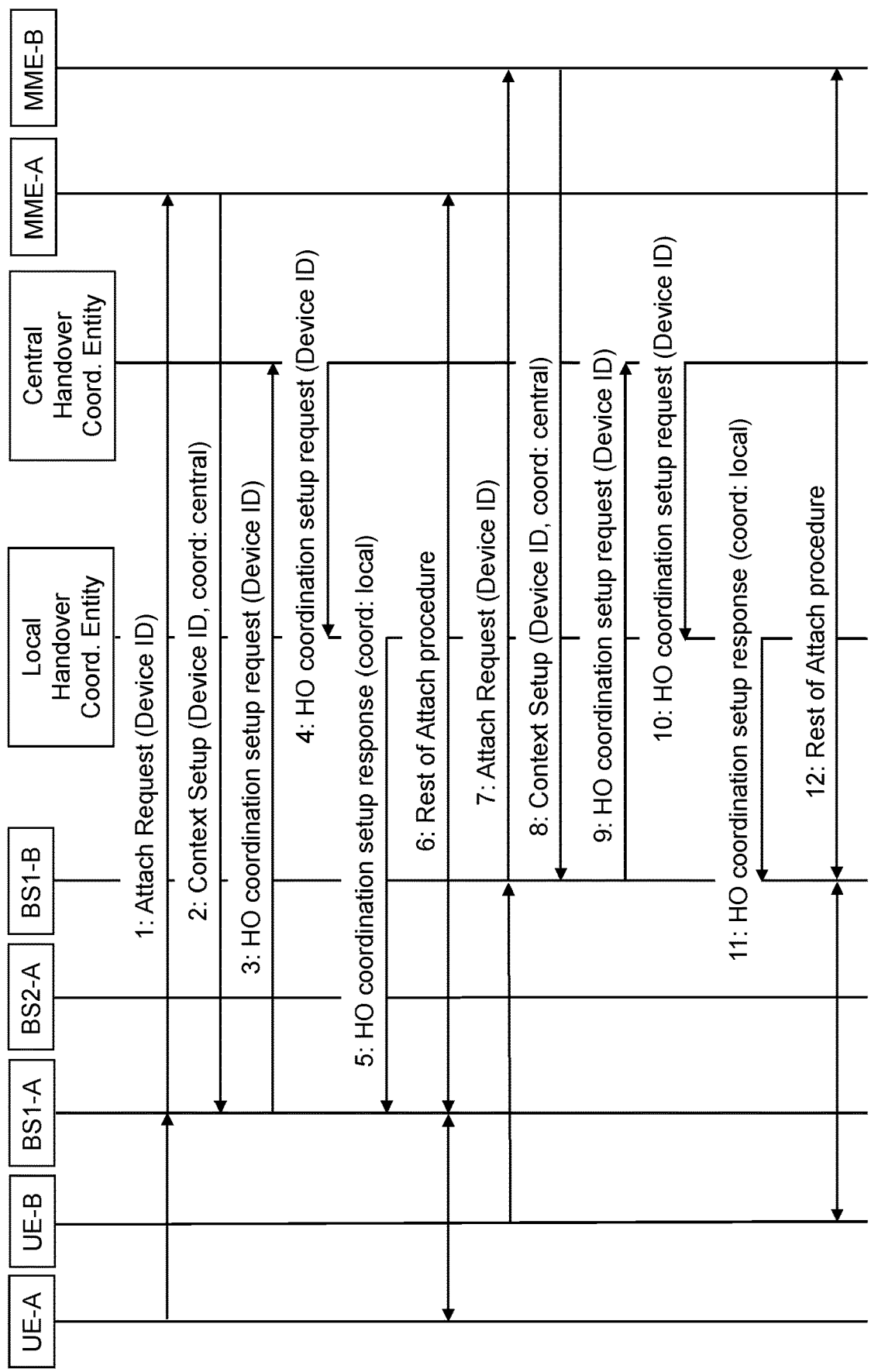

An earlier comment noted the possibility of having more than one handover coordination node 40 in the network 12, and that possibility raises the issue of ensuring that affiliated UEs are managed properly, e.g., all coordinated by the same the handover coordination node 40. FIG. 12 contemplates the use of one or more central handover coordination entities along with any number of local handover coordination entities. All such entities may be understood as a distributed implementation of the handover coordination node 40 described earlier. Here, each local handover coordination entity may have responsibility for a given mobility area—e.g., tracking area or group of BSs—in the network 12.

In Step 1 of FIG. 12, the UE-A initiates an attach procedure by sending Attach Request message that includes the Device ID of its associated remote device 16. Step 2 involves setting up the RAN context, which here includes an indication of a central handover coordination entity. to be used for managing handover of the UE-A. In turn, at Step 3, the serving BS, BS1-A, sends a setup message to the identified central handover coordination entity and it cooperates with a selected local handover coordination entity, to initialize handover coordination control for the UE-A. For example, at Step 4, the central handover coordination entity contacts the selected local handover coordination entity, which in turn contacts the serving BS1-A at Step 5.

The rest of the attachment procedure completes for the UE-A at Step 6. Further, Steps 7-12 depict similar processing for the UE-B, which attaches to the BS1-B as its serving BS. One notable point, however, involves the central handover coordination entity detecting from the Device ID it receives for the UE-B that the UE-B is affiliated with the UE-A. Based on that recognition, the central handover coordination entity assigns handover coordination responsibility for the UE-B to the same local handover coordination entity that it selected for the UE-A. The same approach would hold true for any further affiliated UEs that subsequently undergo attachment to the network while either the UE-A and the UE-B remain connected. Such operations allow, for example, load balancing between multiple local handover coordination entities.

Figure 13:
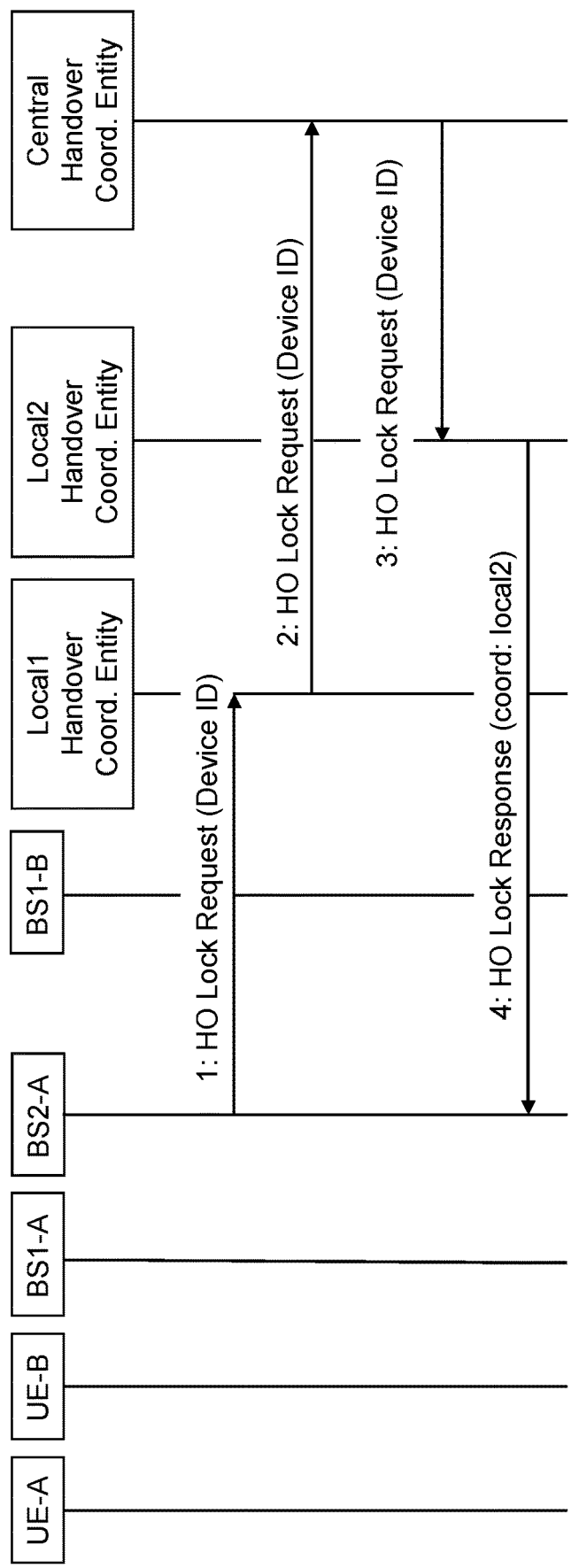

At least in implementations where the local handover coordination entities map to respective service areas or aggregations of service areas within the network 12, movement of affiliated UEs within the RAN 28 may necessitate changing the local handover coordination entity assigned to coordinate the handover of a pair or set of affiliated UEs. FIG. 13 depicts one approach to such management.

Figure 14:
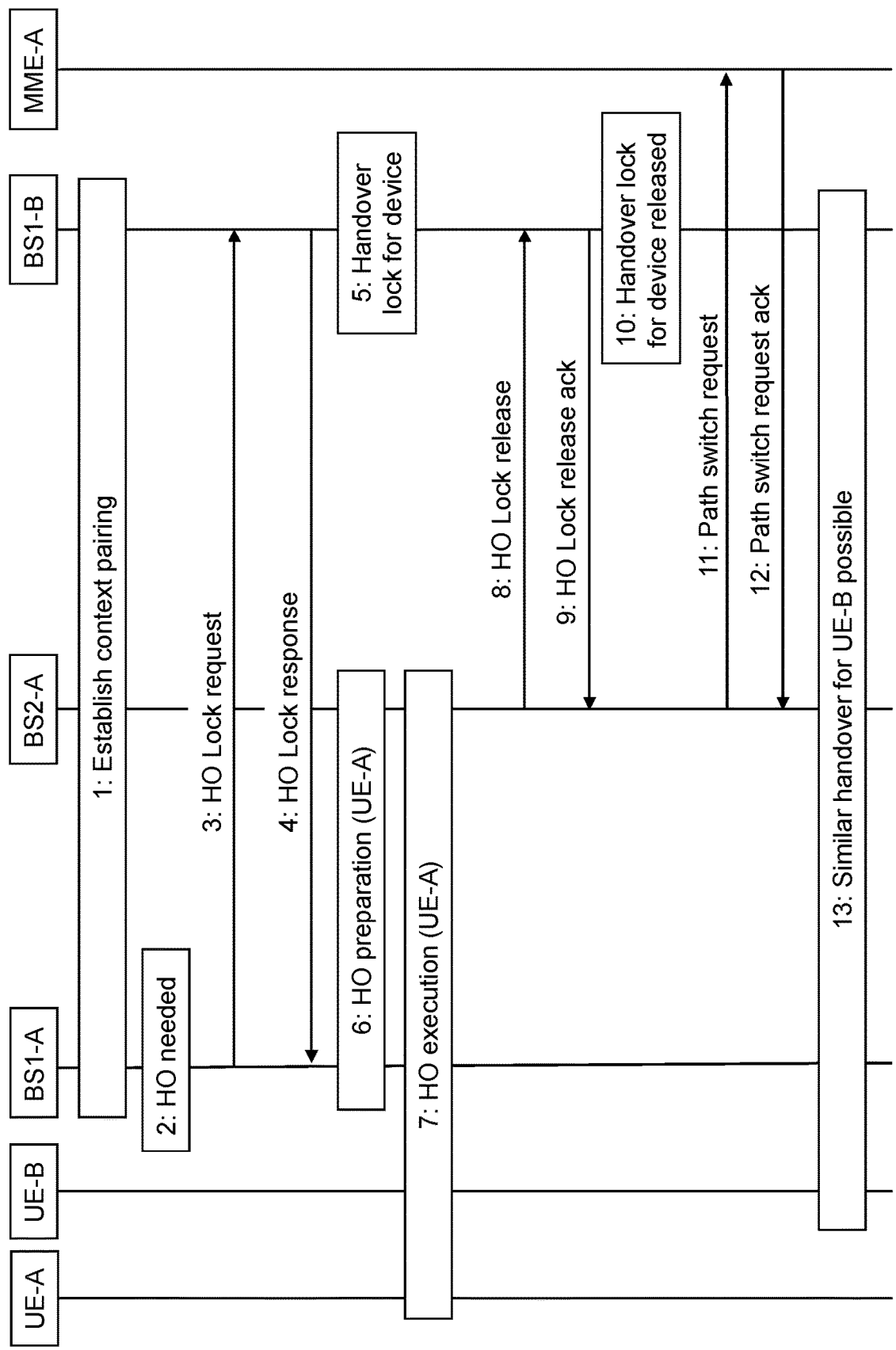

FIG. 14 depicts an embodiment that eschews use of centralized handover coordination entities, in favor of cooperative handover control between the control nodes 10. Assume that the BS1-A, the BS2-A, and the BS1-B each incorporate a control node 10. While use of centralized handover coordination offers certain advantages, such as by not imposing the coordination burden on the involved BSs or their respective control nodes 10, direct coordination between BSs or their respective control nodes offer other advantages. Such operation relies on several features, such as each BS being configured to maintain the identities of other BSs holding UE contexts for any UEs affiliated with the UEs being served by it.

Further assume that the UE-A attaches to the network 12 through the BS1-A and that the UE-B attaches to the network 12 through the BS1-B, and that the BSs establish context pairing at Step 1. Context pairing involves the BSs mutually determining which BSs are involved in serving affiliated UEs. For example, the BS contexts of affiliated UEs point to each other, e.g., the context for the UE-A in the BS1-A contains an identifier of the BS1-B. In turn, the context for the UE-B in the BS1-B includes an identifier for the BS1-A.

At Step 2, the BS1-A decides to initiate handover for the UE-A, and at Step 3 it sends a handover lock request to the BS1-B, based on its knowledge that the BS1-B serves the affiliated UE-B. The BS1-B sends a handover lock response granting the lock, i.e., allowing the handover to proceed, based on there being no handover pending or ongoing for the UE-B.

Steps 6 and 7 involve handover preparation and execution for the UE-A at the BS1-A, and Step 5 involves the BS1-B locking handover of the UE-B. With the BS2-A being the BS targeted in the handover of the UE-A, the BS2-A at Step 8 sends a handover lock release request to the BS1-B upon completion of the handover of the UE-A from the BS1-A to the BS2-A. The BS2-A knows the identity of the BS1-B from the context pairing done in Step 1. The BS1-B responds at Step 9 with a handover lock release acknowledgment, and at Step 10 the BS1-B releases the handover lock against the UE-B. One may regard the lock as being applied and released against the involved remote device 16, meaning that handover is locked for all remaining affiliated UEs of the remote device 16 when handover is pending or active for one of its affiliated UEs.

Further, in response to receiving the UE-A in handover, the BS2-A sends a path switch request to the MME-A (Step 11), reflecting the fact that the BS2-A is now the serving BS for the UE-A, and it receives a path switch request acknowledgment in return (Step 12). At this point (Step 13), the handover of the UE-B is possible. Such processing extends to cases where the involved remote device 16 includes more than two affiliated UEs.

The processing of FIG. 14 also may include conflict resolution, e.g., based on prioritizing the handover of one affiliated UE over another affiliated UE. Prioritization schemes use predefined or static prioritization information, such as where one UE operates as a primary UE while the other UE operates as a secondary UE. Additionally, or as an alternative, prioritization operates dynamically, e.g., based on any one or more of comparative radio conditions, the relative loading of the involved base stations, the relative activity, amounts of traffic, or data rates on the involved radio links, etc.

Figure 15:
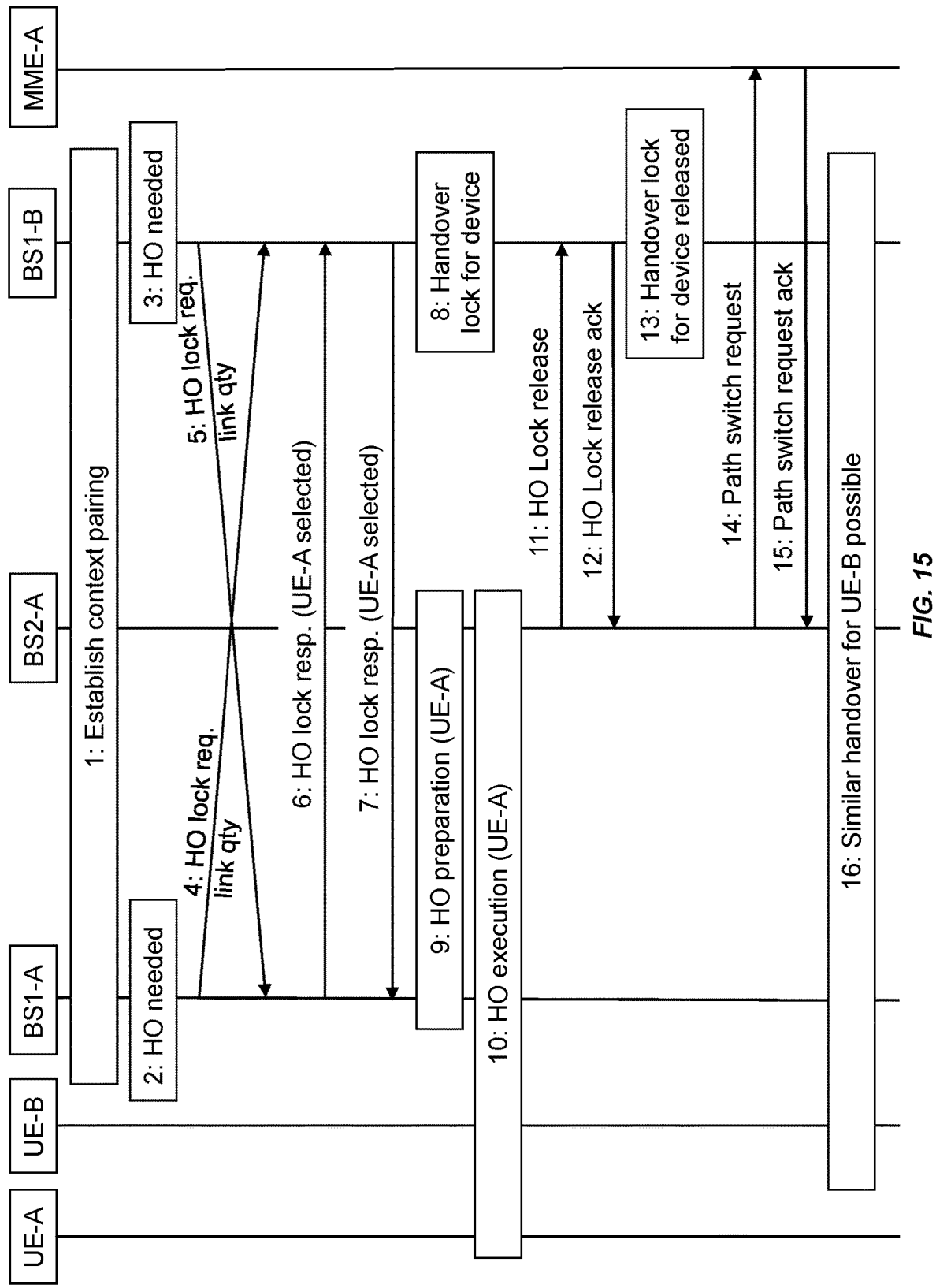

In an example of static prioritization, the BSs are configured to prioritize one UE identifier—e.g., one IMSI—over another based on some defined evaluation metric. FIG. 15 depicts a dynamic prioritization, where the overall processing logic captured in Steps 1-16 correspond to the steps depicted in FIG. 14. However, the signaling "protocol" depicted in FIG. 15 includes the exchange of radio link quality—see Steps 4 and 5—as part of the handover lock request and response signaling. More particularly, the BS1-A serves the UE-A, and the BS1-B serves the UE-B, and both BSs decide at about the same time that handover is needed for their respectively served UEs.

Determining which one of the UEs to hand over first depends on a comparison of their respective radio link qualities. For example, the UE having the lowest radio link quality gets handed over first, to lessen the chance of it experiencing radio link failure.

Figure 16:
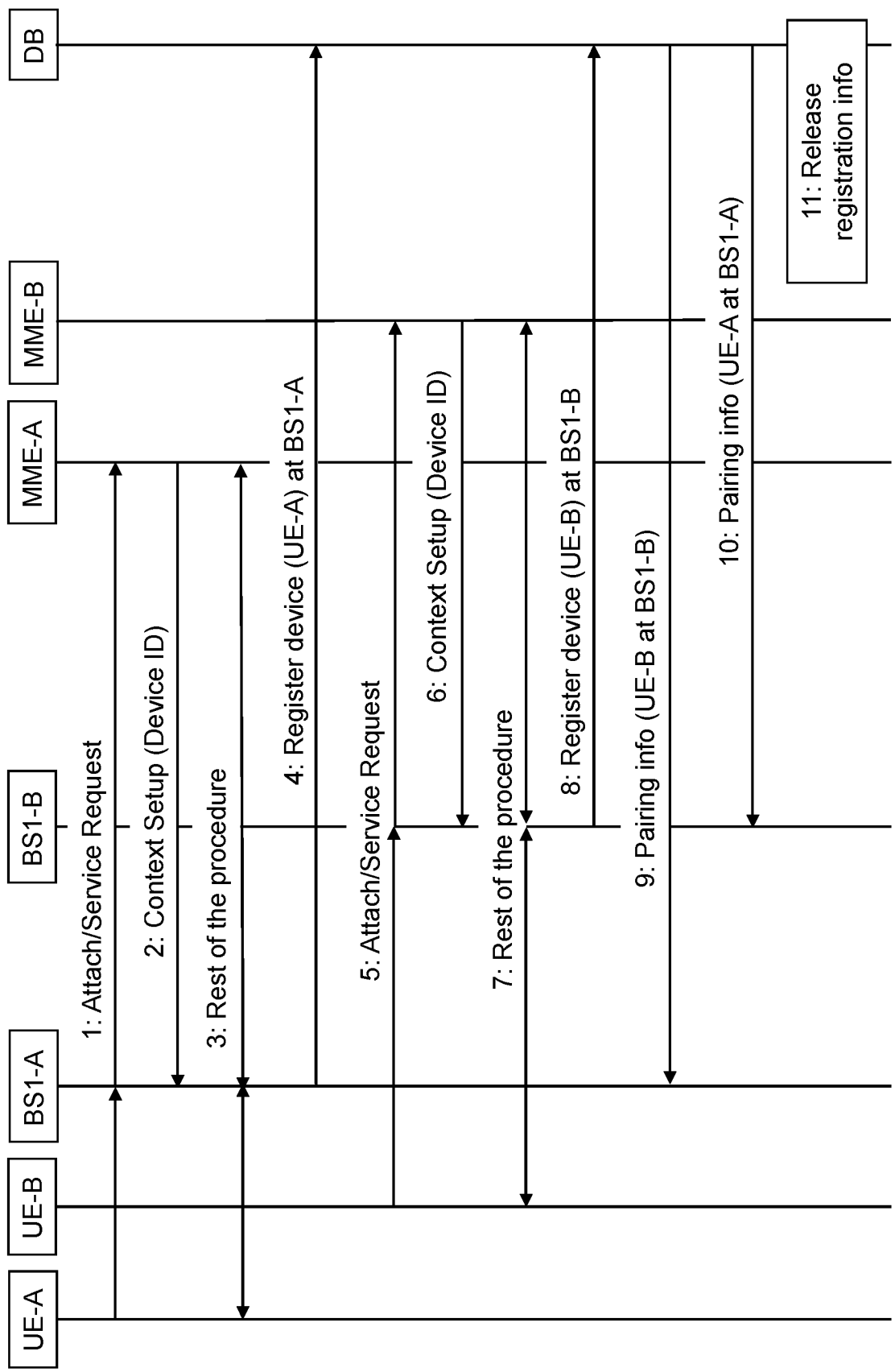

In something of a hybrid approach, FIG. 16 depicts an implementation where the BSs directly coordinate with each other, for controlling handovers of affiliated UEs. However, the network 12 includes a centralized database, e.g., available via a computer server in the CN 28. The centralized database contains affiliation information, e.g., it contains entries that indicate which UEs are registered at which BSs. When a UE context is set up at a first BS, the first BS registers the UE and its Device ID, together with the BS identity, at the central database. When a second BS registers an affiliated UE at the database, the database returns that information to the first BS, and returns complementary information to the second BS, thereby enabling the first and second BSs to coordinate handover locking of the affiliated UEs.

Note that in this approach, the central database only needs to maintain information temporarily. Once the pairing has been done, the information can be released. This can be based on a timeout period after the registration, or the information can be released once a fixed number of UEs per remote device 16 has registered. Steps 1-11 of FIG. 16 depict an example implementation of such processing.

Figure 17:
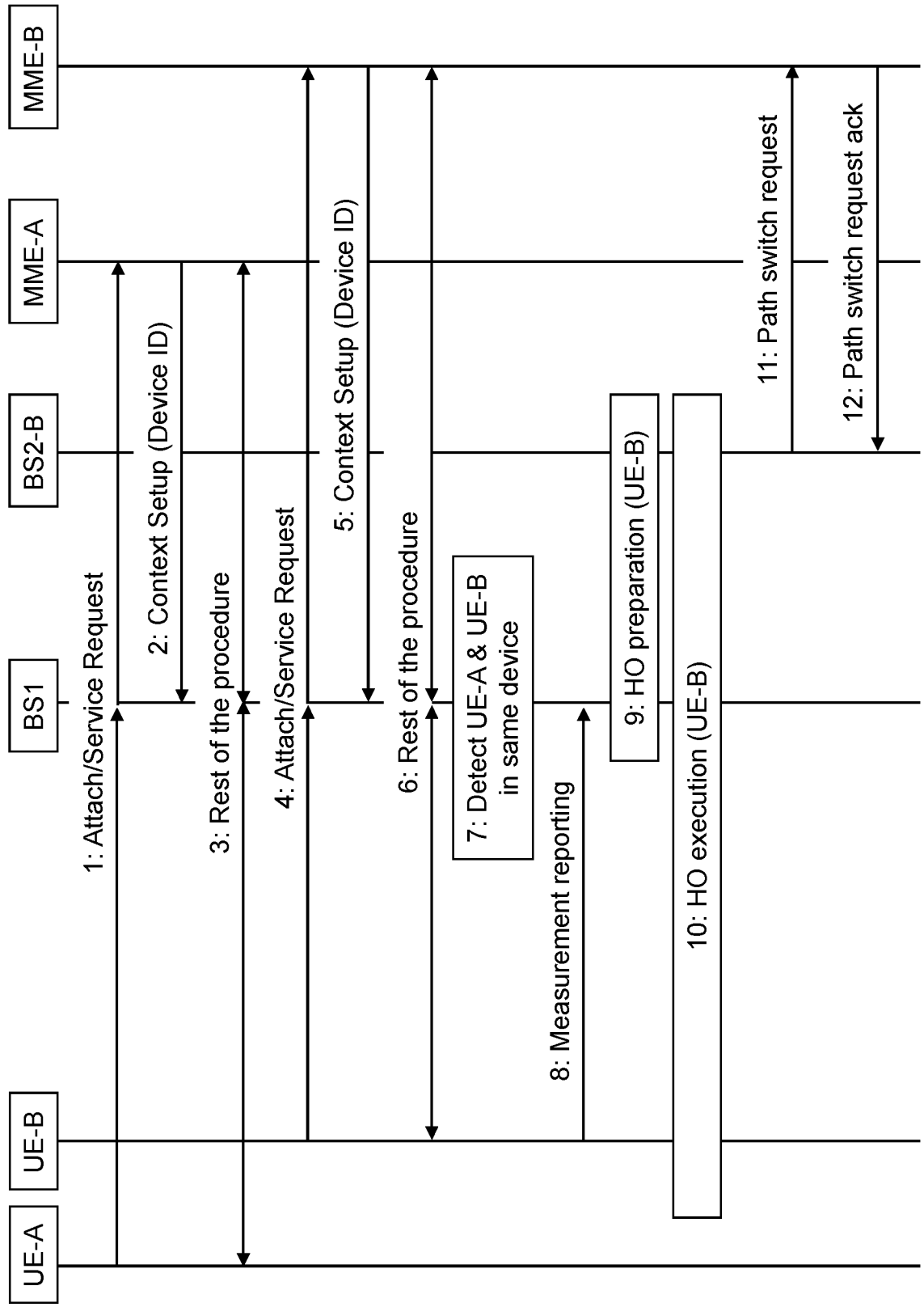

Note that there may be different variants of the above registration mechanism, e.g. instead of the central database sending the information to the BSs involved with a pair or set of affiliated UEs, the BS could also issue an explicit request. The database may be realized based on mechanisms such as Domain Name Services (DNS) lookup, or other database access methods. Further, note that if two affiliated UEs initially attach to the same BS, that BS in one or more embodiments detects the affiliation directly, without need for contacting other BSs or other nodes or databases. Steps 1-12 of FIG. 17 depict such operation at a BS denoted as "BS1", where the UE-A and the UE-B are affiliated and both initially attach to the BS1.

Other mechanisms of UE context pairing are contemplated, such as one based on a type of "paging." For example, a first BS serving a first UE identifies other BSs serving affiliated UEs by directly contacting neighboring BSs. With the affiliated UEs being associated with the same remote device 16, only in exceptional cases would two affiliated UEs not be connected to geographically proximate BSs.

Alternatively, MMEs in the network 12 conduct similar paging, which works nicely because the MMEs have the UE context information and can identify which BSs are involved with affiliated UEs and notify the BSs accordingly. The MMEs may communicate with each other for such purposes or query a centralized database. Of course, other network entities may perform or support such "paging", with a Home Subscriber Server (HSS) being one example. Still further, the UEs within a given remote device 16 may be configured to exchange information about the BSs they are connected to and inform the involved BSs via RAN signaling. Alternatively, the UEs inform the CN 28 using Non-Access Stratum (NAS) signaling, and the CN 28 informs the involved BSs.

Figure 18:
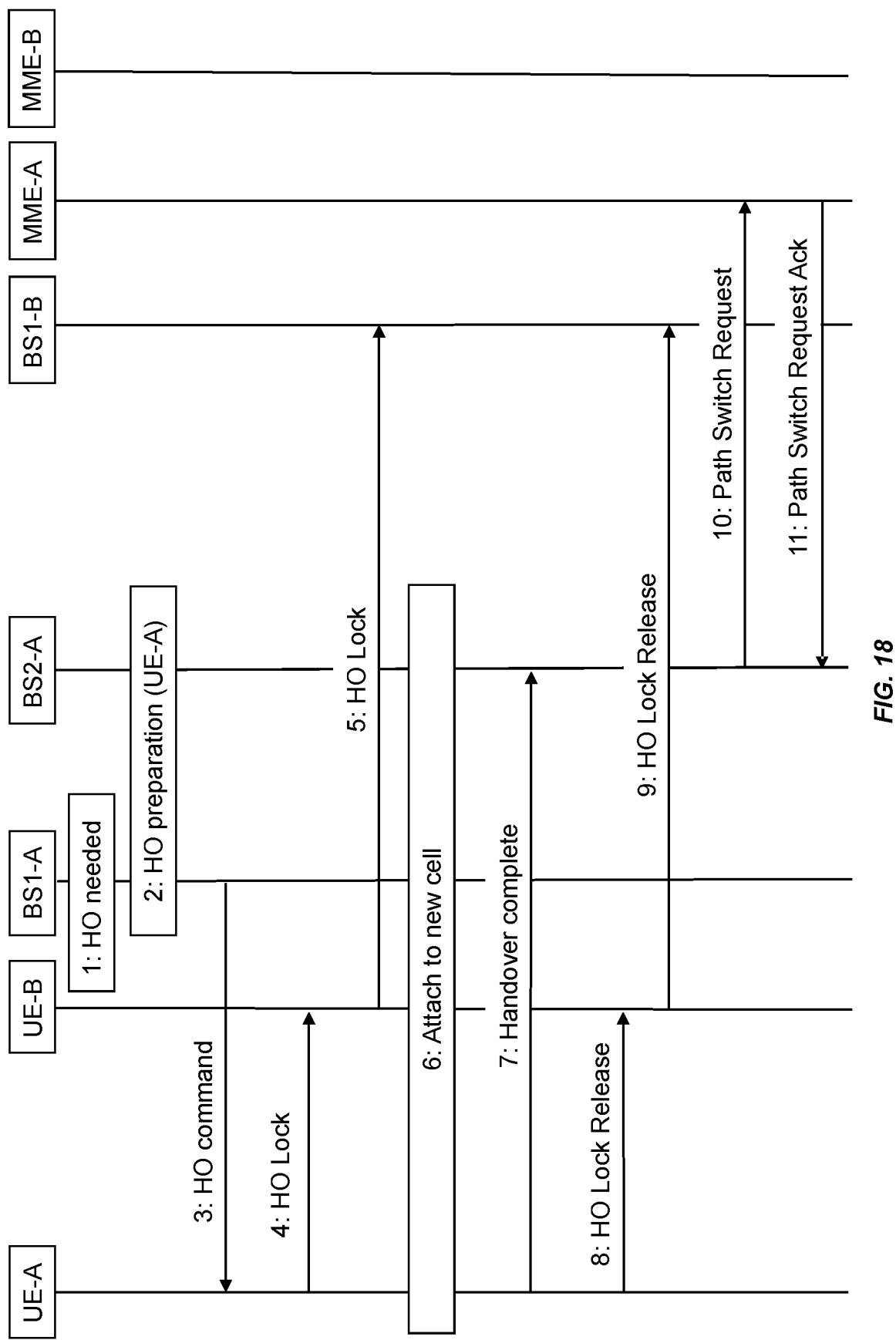

The UEs in the device exchange information about the BS that they are connected to, and inform the BSs via RAN signaling, or inform the CN by NAS signaling followed by signaling from the CN to the RAN. Taking the inter-UE coordination even further, one embodiment contemplated herein relies on the UEs within a remote device 16 to coordinate handovers—i.e., impose handover lockouts. FIG. 18 depicts an example implementation.

As seen in Steps 1-11 of FIG. 18, when one UE in a remote device 16 is to perform handover, it notifies the other UEs in the remote device 16. The other UEs may inform their respective BSs to avoid handover. Alternatively, the UEs may defer the handover process on their own.

Note that it may be possible to skip Steps 5 and 9, and in case the UE-B needs to perform handover while a handover lock is in place, the UE-B can defer its handover. However, this approach may not be as efficient, because the BS1-B would not be aware of the deferred handover, and the extended handover time may lead to failed handovers. Also, the UE-B may not be able to communicate if its serving BS assumes that a handover is in progress.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation performed by a network node in a wireless communication network, the method comprising:
   determining that a service handover is to be initiated for a first communication module operating in the network;
   obtaining information indicating that a second communication module that is attached to the network is affiliated with the first communication module, wherein affiliated communication modules provide redundant connectivity to the wireless communication network; and
   applying a scheduling or locking mechanism, to prevent the service handover for the first communication module from coinciding with service handovers involving the second communication module;
   wherein applying the scheduling or locking mechanism comprises at least one of:
      assigning the first communication module to one of two or more recurring, disjoint intervals, and restricting initiation of the service handover for the first communication module to instances falling within the assigned interval, or initiating such assignment by a first access point to which the first communication module is attached; or
      communicating with another network node to obtain a lockout status of the first communication module, wherein the lockout status indicates whether the service handover of the first communication module may be initiated or must be deferred, to avoid coinciding with a service handover for the second communication module.

2. The method of claim 1, wherein determining that the service handover is to be initiated for the first communication module comprises obtaining a handover decision indication from the first access point.

3. The method of claim 1, wherein communicating with the other network node to obtain the lockout status of the first communication module comprises:
   sending first signaling indicating that the service handover is to be initiated for the first communication module, the first signaling further indicating an identifier of the first communication module or indicating an identifier of a remote device that uses the first communication module for connecting to the network; and
   receiving second signaling indicating the lockout status of the first communication module.

4. The method of claim 3, responsive to determining from the second signaling that the first communication module is not locked from service handovers, initiating the service handover for the first communication module.

5. The method of claim 1, wherein communicating with the other network node to determine the lockout status of the first communication module includes sending the other network node prioritization information enabling the other network node to prioritize the service handover for the first communication module relative to an ongoing or impending service handover for the second communication module.

6. The method of claim 5, wherein the prioritization information indicates signal conditions at the first communication module relative to the network.

7. The method of claim 1, wherein the method includes registering the first communication module with a handover coordination node in response to the first communication module attaching to the first access point, thereby enabling the handover coordination node to identify the first communication module as being affiliated with the second communication module and indicate to the network node whether the network node must defer the initiation of the service handover for the first communication module, to avoid overlapping with a service handover for the second communication module.

8. A network node configured for operation in a wireless communication network, the network node comprising:
   communication circuitry configured to communicatively couple the network node to one or more other nodes in the network, for controlling service handovers for one or more communication modules operating in the network; and
   processing circuitry operatively associated with the communication circuitry and configured to:
      determine that a service handover is to be initiated for a first communication module operating in the network;
      obtain information indicating that a second communication module that is attached to the network is affiliated with the first communication module, wherein affiliated communication modules provide redundant connectivity to the wireless communication network; and
      apply a scheduling or locking mechanism, to prevent the service handover for the first communication module from coinciding with service handovers involving the second communication module;
      wherein applying the scheduling or locking mechanism comprises at least one of:
         assigning the first communication module to one of two or more recurring, disjoint intervals, and restricting initiation of the service handover for the first communication module to instances falling within the assigned interval, or initiating such assignment by a first access point to which the first communication module is attached; or
         communicating with another network node to obtain a lockout status of the first communication module, wherein the lockout status indicates whether the service handover of the first communication module may be initiated or must be deferred, to avoid coinciding with a service handover for the second communication module.

9. The network node of claim 8, wherein the processing circuitry is configured to determine that the service handover is to be initiated for the first communication module by obtaining a handover decision indication from the first access point.

10. The network node of claim 8, wherein, for communicating with the other network node to obtain the lockout status of the first communication module, the processing circuitry is configured to:
  send first signaling indicating that the service handover is to be initiated for the first communication module, the first signaling further indicating an identifier of the first communication module or indicating an identifier of a remote device that uses the first communication module for connecting to the network; and
  receive second signaling indicating the lockout status of the first communication module.

11. The network node of claim 10, wherein the processing circuitry is configured to initiate the service handover for the first communication module, in response to determining from the second signaling that the first communication module is not locked from service handovers.

12. The network node of claim 8, wherein, for communicating with the other network node to determine the lockout status of the first communication module, the processing circuitry is configured to send the other network node prioritization information enabling the other network node to prioritize the service handover for the first communication module relative to an ongoing or impending service handover for the second communication module.

13. The network node of claim 12, wherein the prioritization information indicates signal conditions at the first communication module relative to the network.

14. The network node of claim 8, wherein the processing circuitry is configured to register the first communication module with a handover coordination node in response to the first communication module attaching to the first access point, thereby enabling the handover coordination node to identify the first communication module as being affiliated with the second communication module and indicate to the network node whether the network node must defer the initiation of the service handover for the first communication module, to avoid overlapping with a service handover for the second communication module.

15. A method of operation in a wireless communication network, the method comprising:
  identifying a first communication module as being affiliated with a second communication module, wherein the first and second communication modules are attached to the network via one or more serving access points in the network; and
  responsive to identifying the first and second communication modules as being affiliated, arbitrating service handovers respectively involving the first and second communication modules, to prevent service handovers for the first communication module from coinciding with service handovers for the second communication module;
  wherein arbitrating service handovers comprises communicating with one or more control nodes that are included in or associated with the one or more serving access points, including receiving a service handover request for one of the first and second communication modules and denying the service handover request in response to determining that a service handover has been approved or is ongoing for the other one of the first and second communication modules.

16. The method of claim 15, wherein arbitrating service handovers further comprises receiving a service handover request for one of the first and second communication modules, and, in response to determining that no other service handover has been approved or is ongoing for the other one of the first and second communication modules, sending an approval of the service handover request.

17. The method of claim 16, further comprising denying approval of any service handover request subsequently received for the other one of the first and second communication modules until determining that the service handover corresponding to the approved service handover request has been completed or terminated.

18. The method of claim 15, wherein arbitrating service handovers further comprises receiving a service handover request for one of the first and second communication modules, and, in response to determining that no other service handover has been approved or is ongoing for the other one of the first and second communication modules, deferring approval of the service handover request for a defined interval and, responsive to receiving a service handover request for the other one of the first and second communication modules within the defined interval, deciding which one of the service handover requests to approve based on evaluating prioritization information associated with the service handover requests.

19. A network node configured for operation in a wireless communication network, the network node comprising:
  communication circuitry configured for communicating with one or more control nodes that are included in or associated with one or more serving access points in the network to which first and second communication modules are attached; and
  processing circuitry operatively associated with the communication circuitry and configured to:
    identify the first communication module as being affiliated with the second communication module; and
    responsive to identifying the first and second communication modules as being affiliated, arbitrate service handovers respectively involving the first and second communication modules, to prevent service handovers for the first communication module from coinciding with service handovers for the second communication module;
  wherein, for arbitrating the service handovers, the processing circuitry is configured to receive a service handover request for one of the first and second communication modules and deny the service handover request in response to determining that a service handover has been approved or is ongoing for the other one of the first and second communication modules.

* * * * *